United States Patent [19]

McMaster

[11] 3,994,711

[45] Nov. 30, 1976

[54] GLASS TEMPERING SYSTEM INCLUDING OSCILLATING ROLLER FURNACE

[76] Inventor: Harold A. McMaster, 707 Riverside Drive, Woodville, Ohio 43469

[22] Filed: Sept. 15, 1975

[21] Appl. No.: 613,714

[52] U.S. Cl. .................................. 65/163; 65/114; 65/349; 65/351; 65/374 R
[51] Int. Cl.² ....................................... C03B 27/00
[58] Field of Search ............ 65/114, 163, 348, 349, 65/350, 351, 374 R; 432/121

[56] References Cited
UNITED STATES PATENTS

| | | | |
|---|---|---|---|
| 1,856,669 | 5/1932 | Sylvester | 65/349 X |
| 2,140,282 | 12/1938 | Drake | 65/349 |
| 2,326,044 | 8/1943 | Littleton | 65/253 |
| 3,806,312 | 4/1974 | McMaster et al. | 432/121 |

*Primary Examiner*—Arthur D. Kellogg
*Attorney, Agent, or Firm*—Reising, Ethington, Barnard, Perry and Brooks

[57] ABSTRACT

The glass tempering system includes an elongated furnace in which a horizontal conveyor oscillates a glass sheet between opposite ends of the chamber in a manner to shorten the necessary furnace length to heat the glass to its quench temperature. A load station at one end includes a horizontal conveyor driven by the same drive mechanism as the furnace conveyor during the index cycle so that a glass sheet is received while another glass sheet is being indexed to the quench unit. A second motor drives the quench unit conveyor in an oscillating manner. The two drive mechanisms are coupled during the index cycle so that a tempered glass sheet is conveyed from the quench unit to an unload station as a heated glass sheet is being conveyed to the quench unit. The conveyor of the unload station is driven by the quench unit drive during the index cycle to receive the tempered glass sheet. Each of the conveyors includes drive chains which frictionally drive their conveyor rollers. The conveyor rollers of the load and unload stations are lifted off their respective drive chains to stop the rollers for unloading of the glass thereon.

33 Claims, 20 Drawing Figures

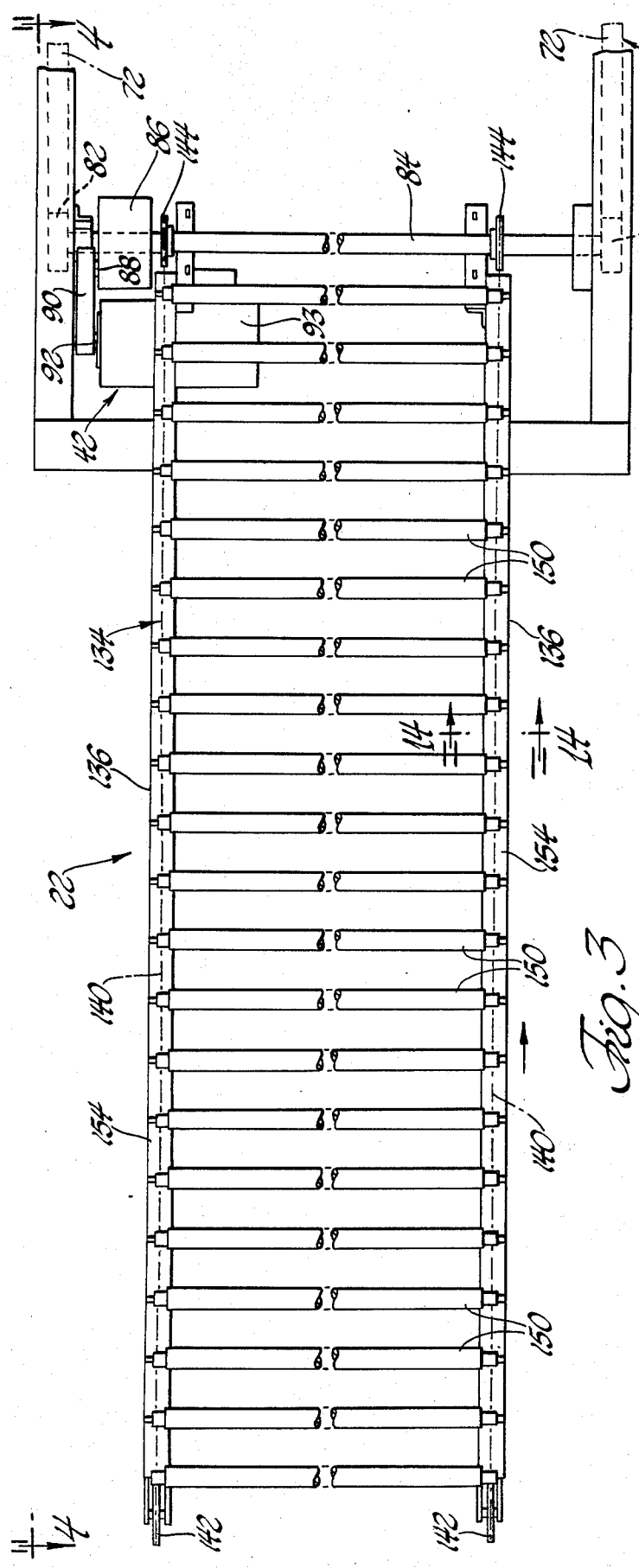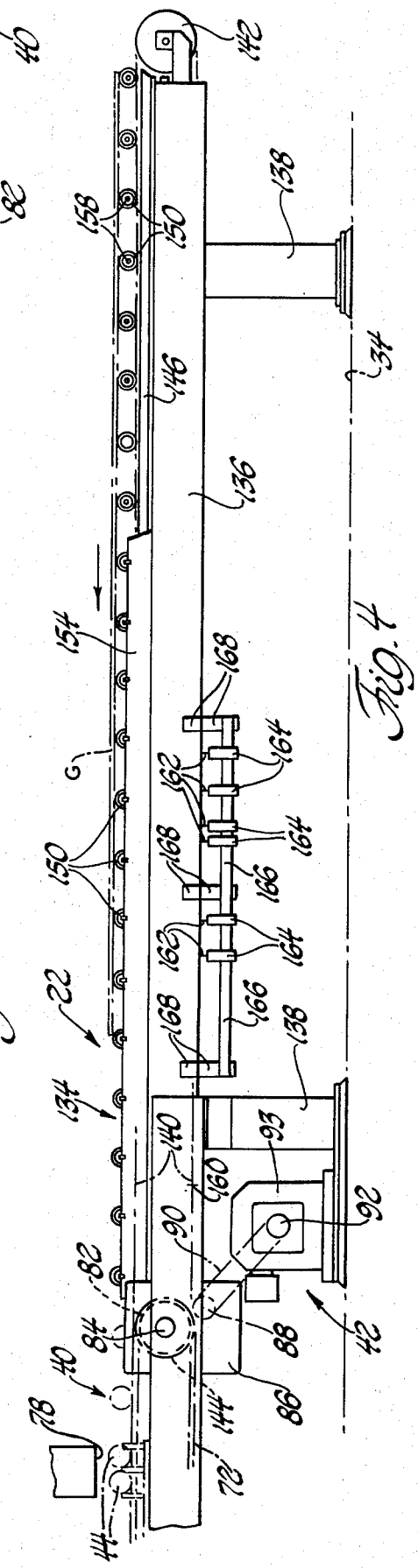

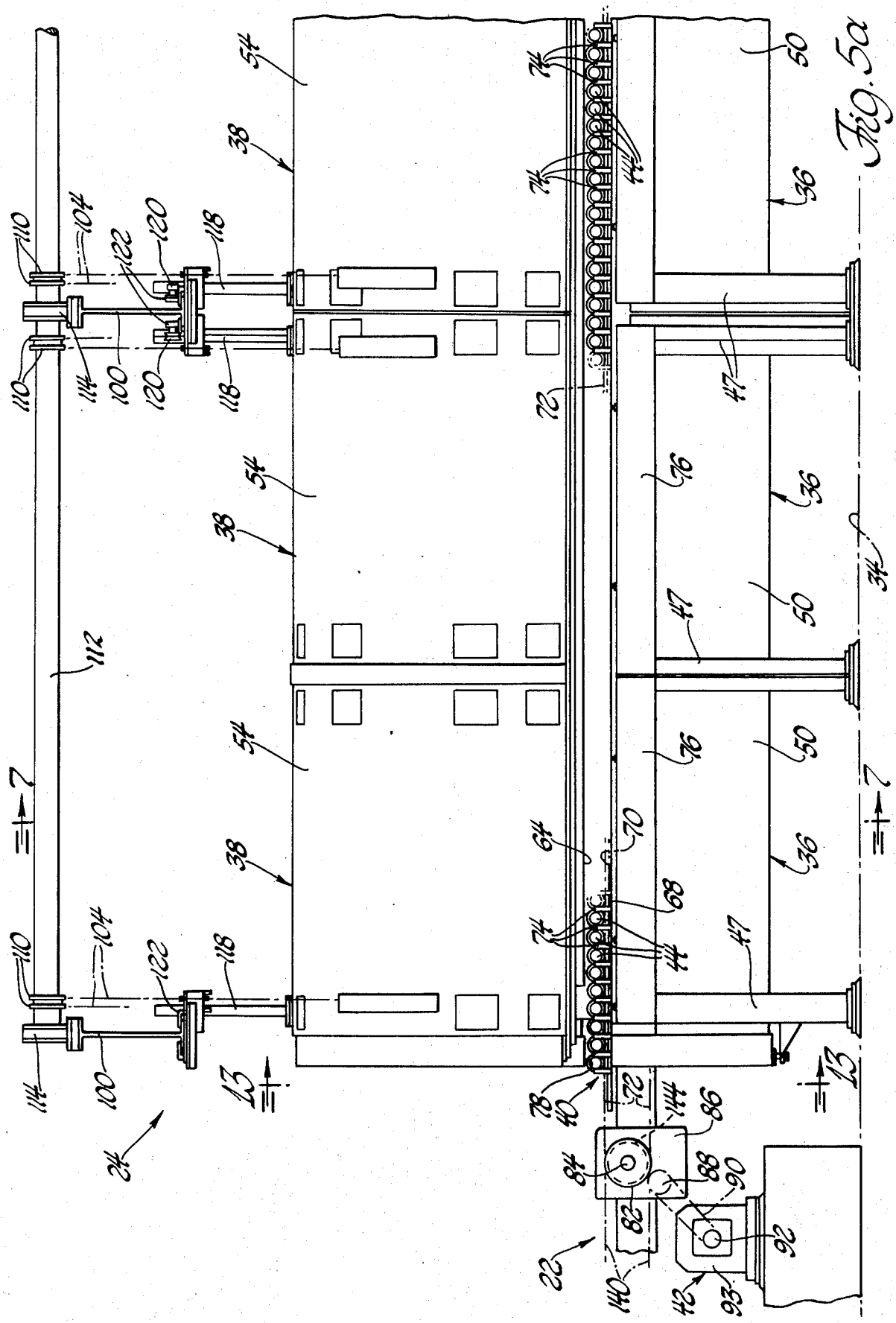

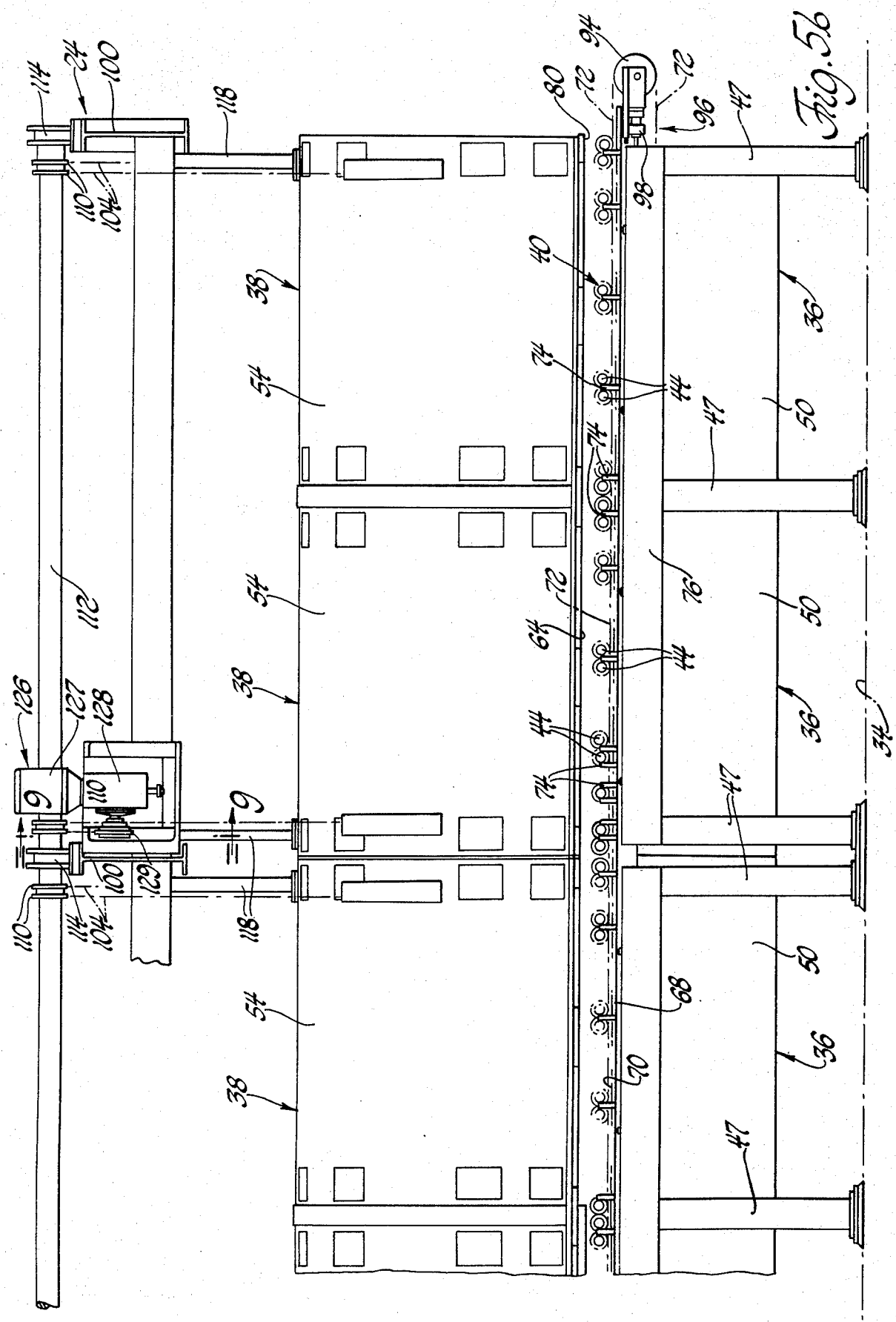

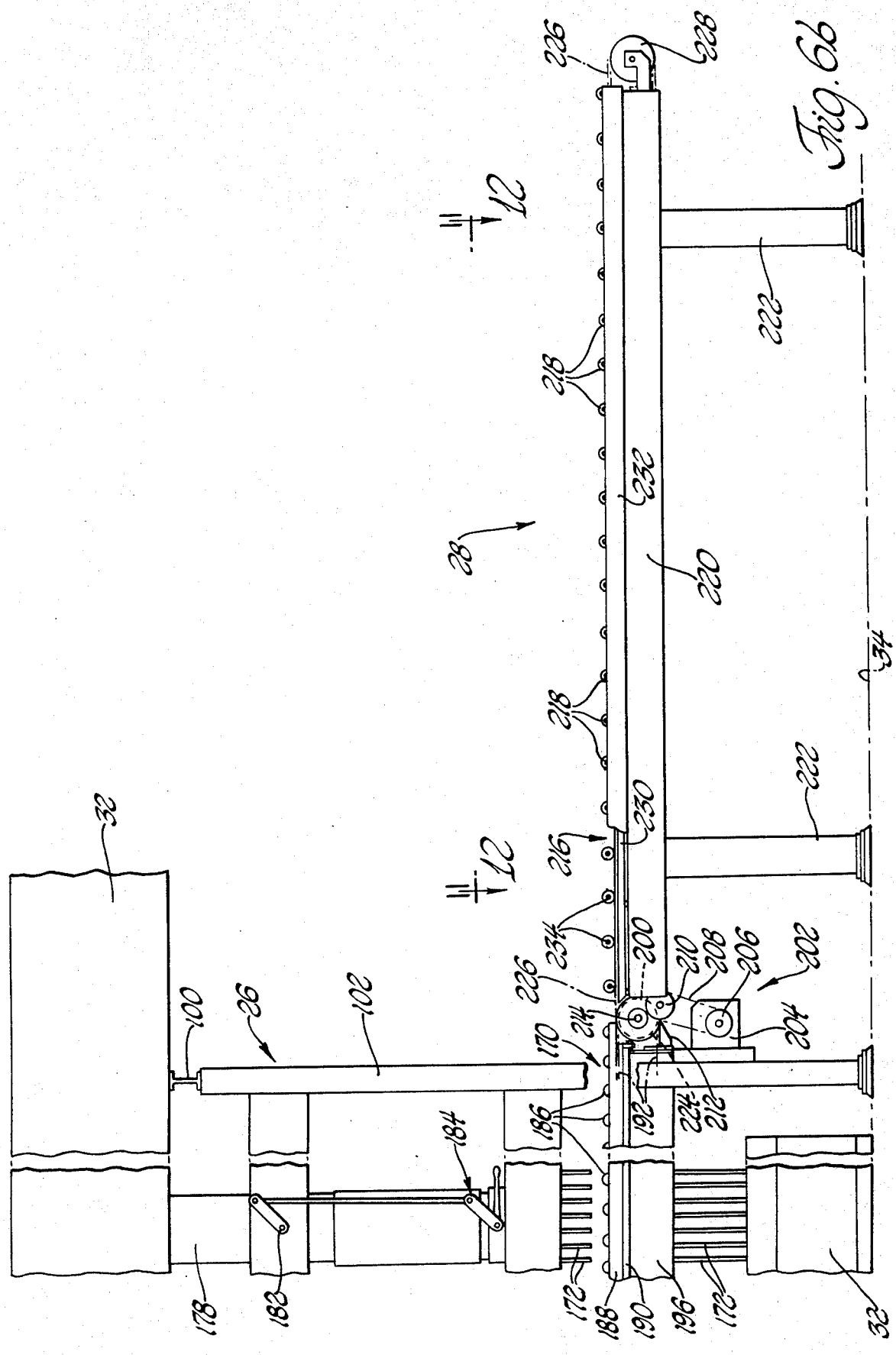

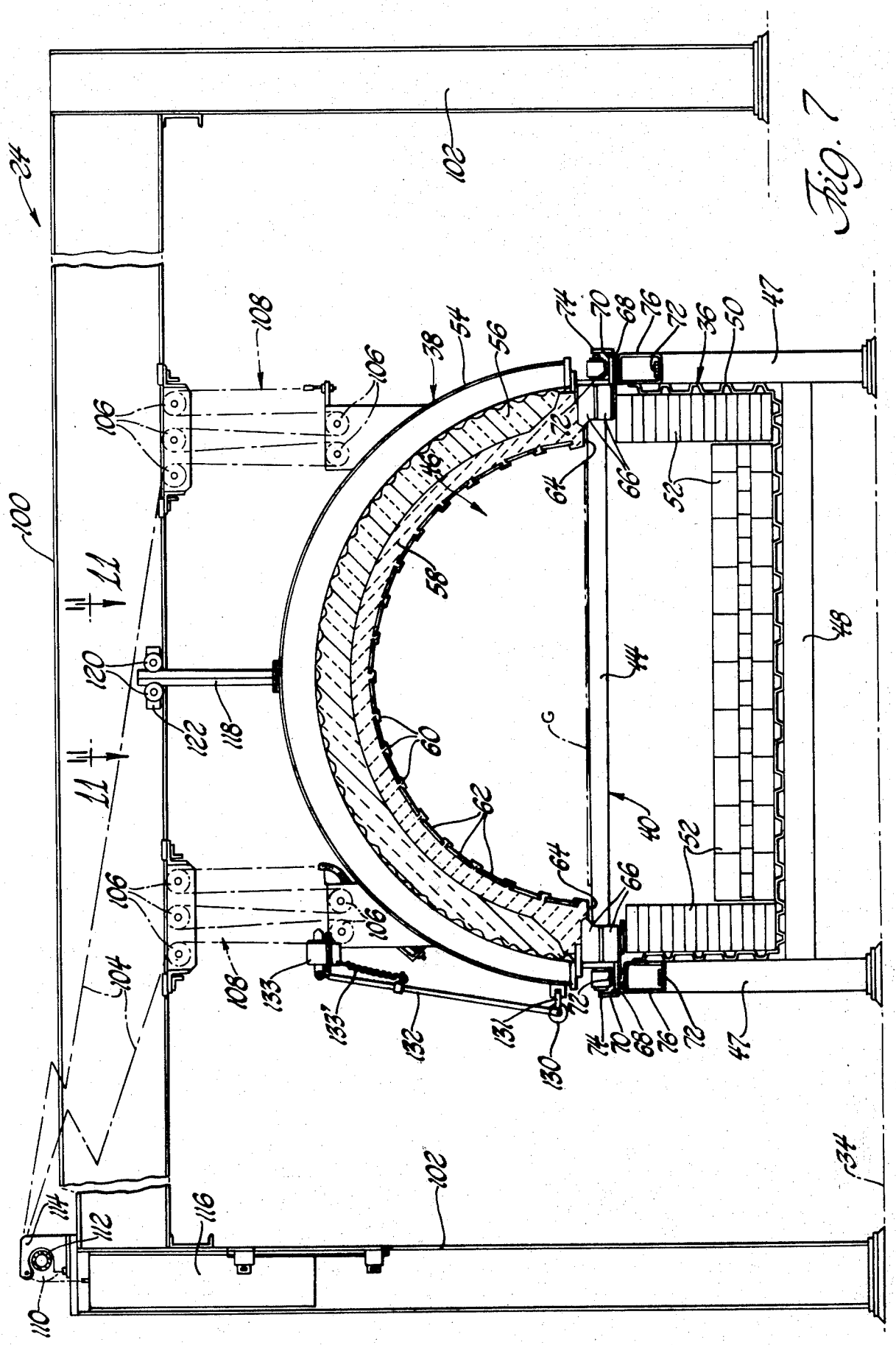

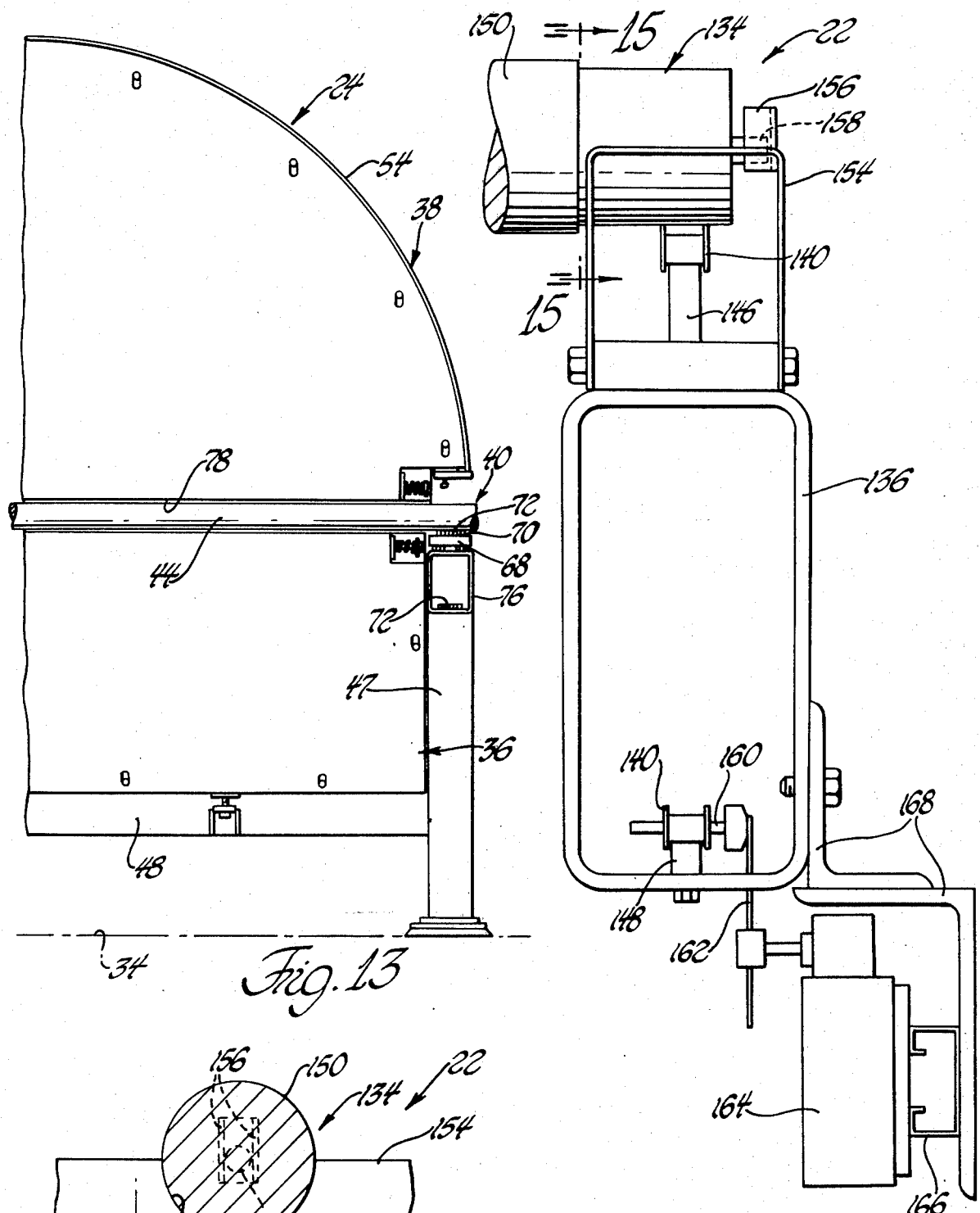

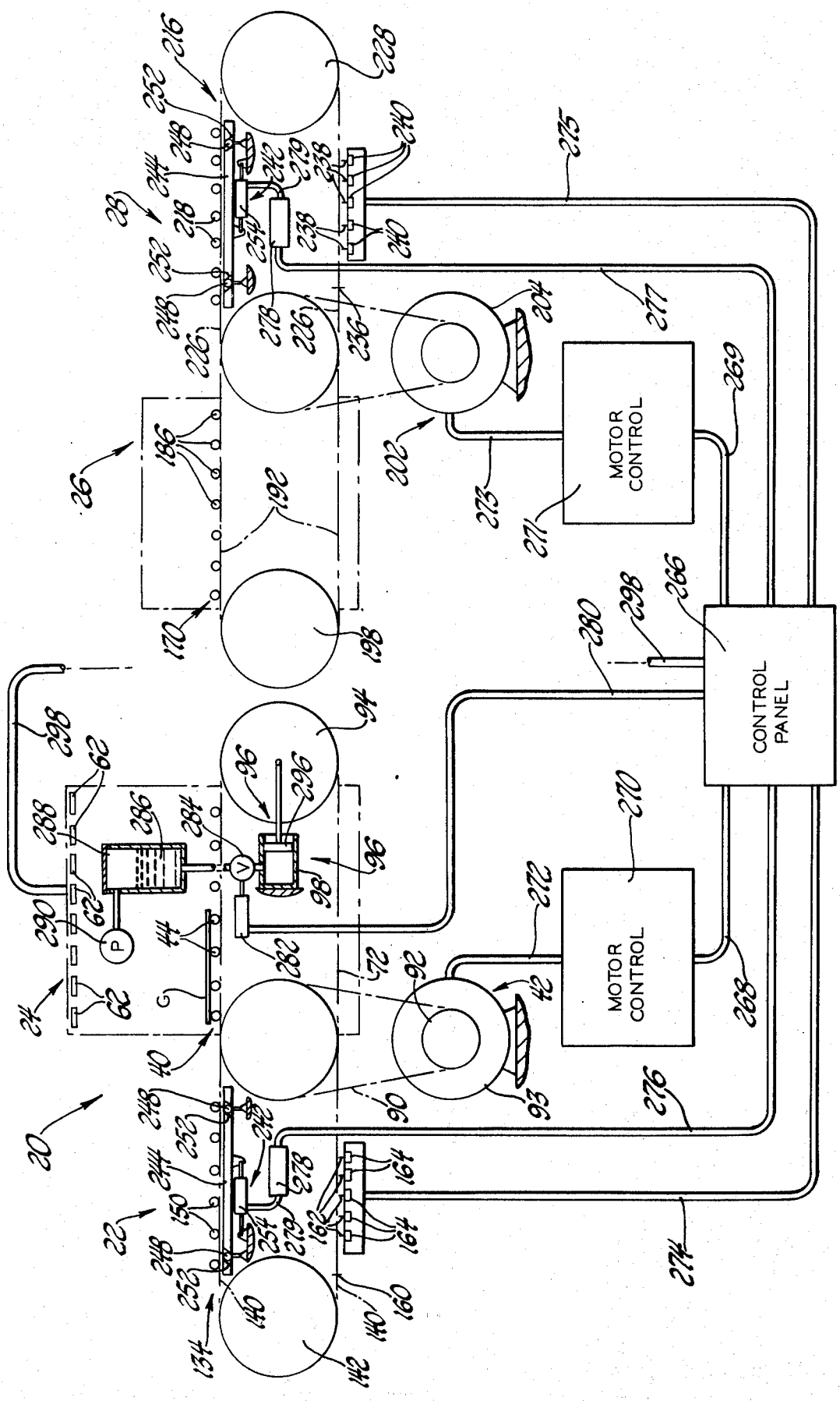

GLASS TEMPERING SYSTEM INCLUDING OSCILLATING ROLLER FURNACE

BACKGROUND OF THE INVENTION

1. Field of the Invention

This invention relates to systems for tempering glass sheets as well as to furnaces utilized in such systems.

2. Description of the Prior Art

Glass sheets are manufactured by first drawing the sheets in a molten form from a bath of molten glass. The molten glass sheets, which are usually of a continuous nature but may also be of a discrete length, are then conveyed through an annealing furnace having a decreasing temperature gradient in a direction along which the glass sheets are conveyed. The decreasing temperature gradient causes the glass to be cooled at a slow rate which prevents the buildup of compressive forces in the glass. Annealed glass may be cut and drilled so as to have the size and configuration desired. After being cut to size and drilled as required, the annealed glass may also be tempered by a heating and sudden cooling process which gives the glass sheets high compressive forces at their surfaces. Tempered glass sheets are less susceptible to breakage, and break into small pieces that are dull and relatively harmless instead of into large, sharp pieces as is the case with untempered glass.

To perform the tampering of glass sheets, systems have been developed in the past utilizing horizontal roller conveyors that convey the glass sheets horizontally first through a furnace and then to a quench unit where the sudden cooling is performed. One such glass tempering furnace is disclosed by the U.S. Pat. No. 3,806,312, of McMaster et al. issued Apr. 23, 1974, and other glass furnaces are shown by the reference cited therein. When being conveyed through a tempering furnace by a horizontal roller conveyor, glass sheets must be moved fast enough so as not to sag between the conveyor rollers. The glass must be moved faster to prevent the sagging when there is a greater spacing between the conveyor rollers are opposed to a smaller spacing. When the roller spacing is on the order of 4 to 6 inches, the glass movement is normally on the order of 45 to 70 feet per minute in order to prevent sagging.

When the hot glass sheets being tempered move from the furnace into the quench unit, warpage and breakage tend to occur because the leading edge of the glass is being cooled and caused to shrink while the trailing end is still hot and in its thermally expanded condition. This tendency is more severe the slower the travel and the wider the glass. Consequently, very wide glass, i.e. 80 inches or so, must be moved into the quench much more rapidly than narrower sheets when conveyed along a continuous conveyor from the furnace to the quench unit. However, this high rate of glass movement necessarily requires the furnace length to be very long, so long in fact that the furnace could not be economically justified in view of the relatively small market for very wide glass.

U.S. patents that are similar to the present invention in some manner are described below, but the differences between these patents and the invention herein disclosed will be apparent.

The U.S. Pats. Nos. 1,856,668, 1,856,669 and 1,879,998 of Julius Sylvester disclose glass annealing systems that incorporate horizontal roller conveyors. These conveyors carry sheets of glass having discrete lengths horizontally through elongated annealing furnaces that have a decreasing temperature gradient in a direction along which the glass is conveyed. The conveyor rollers are alternately rotated in a forward and rearward rotation so that the glass is conveyed along the decreasing temperature gradient in a "two steps forward and one step backward" manner to thereby provide annealing of the glass. Such a furnace requires a large number of reversals of the direction of roller rotation in order to provide the proper treatment of the glass.

The U.S. Pat. No. 3,447,788 of June R. Bornor discloses a furnace having a horizontal roller conveyor that reciprocates a workpiece to be heated a slight amount in order to avoid the concentration of heat on the same areas of the workpiece. The purpose of this reciprocation is to insure uniform heating of the workpiece within the furnace.

SUMMARY OF THE INVENTION

An object of the present invention is to provide a glass tempering furnace including a furnace housing defining a horizontally elongated heating chamber in which a horizontal roller conveyor oscillates a sheet glass load to be heated in an end-for-end manner between the opposite ends of the chamber in a manner that prevents sagging of the heated glass between the conveyor rollers, and the furnace conveyor also has an index cycle wherein all of the rollers thereof are rotated to convey a heated sheet glass load out of the furnace or receive a sheet glass load to be heated.

The furnace heating chamber can be relatively short compared to that required for conventional tempering furnaces wherein glass is conveyed only in one direction. The distance of travel during each oscillation times the number of oscillations permits a total distance of travel equal to many times the length of the furnace for obvious economy without sacrificing qualtiy in the glass.

Since the ends of the furnace heating chamber are exposed to the glass load less than its central portion, more heat input is supplied to the central furnace portion than to the ends. To insure that the glass temperature is uniform along the length of the sheet glass load, the heat input to the furnace is variable along its length.

Another object of the present invention is to provide a glass tempering system including a furnace with a horizontal roller conveyor for oscillating a sheet glass load between the ends of a heating chamber thereof and having an index cycle for indexing a heated sheet glass load from one end of the furnace onto an adjacent horizontal roller conveyor of a quench unit while a horizontal roller conveyor of a load station at the other end of the furnace indexes a sheet glass load into the furnace and a horizontal roller conveyor of an unload station receives a tempered sheet glass load from the quench unit.

The load station and furnace conveyors are driven by a common electric motor drive mechanism during the index cycle while the quench unit and unload station conveyors are driven by a second electric motor drive mechanism. The two drive mechanisms are electrically coupled during the index cycle to provide a smooth flow of glass from the load station into the furnace, from the furnace into the quench unit, and from the quench unit to the unload station. After indexing as the first drive mechanism begins to oscillate the glass within the furnace, the second drive mechanism also begins to oscillate the sheet glass load in the quench unit so that the quenching gas is distributed to provide a uniform quench. The conveyor rollers of the load and unload stations are uncoupled from their respective drive mechanisms during the glass oscillation so as to remain stationary and enable operators to unload the glass that has been tempered and also load glass to be tempered.

The indexing proceeds at an accelerated rate from the rate of oscillating glass movement so that the heated glass moves into the quench unit in a very short time to prevent the loss of heat and to reduce warpage of wide glass that would occur if the leading end of the glass was cooled substantially while the trailing edge was still hot. In one mode of operation, the quenching gas is turned off during the index cycle and subsequently turned on to simultaneously quench the total area of the heated sheet glass load without any warpage even when wide glass sheets are quenched.

Each conveyor of the glass tempering system includes a pair of continuous drive chains associated with opposite lateral sides thereof and trained over respective chain sheaves. The rollers of each conveyor extend laterally with respect to the direction of conveyance thereof and have their ends supported by the drive chains during the index cycle so as to be frictionally driven thereby in response to drive chain movement in a manner that conveys glass supported by their intermediate portions. The rollers of the furnace and quench unit conveyors remain in frictional engagement with their respective drive chains after indexing so that reversible driving movement of their respective drive mechanisms drives the conveyors to produce the oscillating glass movement. The drive chains of the furnace conveyor are maintained in a tensioned condition by a hydraulic tightener arrangement of a gas over liquid type that resiliently tightens the chains during one direction of the oscillation and is valved to lock liquid within the arrangement during the opposite direction of oscillation when the tightener arrangement carries the frictional driving force of the furnace conveyor rollers. After the index cycle, the rollers of the load and unload station conveyors are lifted off their respective drive chains by hydraulically actuated cam arrangements so as to remain stationary during the glass oscillation and enable operators to unload the glass that has been tempered and also load glass to be tempered. The drive chains of the load and unload stations actuate switches that control the extent of the glass oscillation within the furnace and the quench unit, the rates of acceleration and deceleration during the oscillation, and commencement and termination of an index cycle.

The furnace of the glass tempering system preferably includes a fixed lower housing portion and a movable upper housing portion that opens downwardly in a semicircular cross-section which carries heating elements for heating an oscillating sheet glass load on the furnace conveyor. The upper housing portion is movable in a counterbalanced manner between an upper open position where access into the furnace is permitted and a lower closed position immediately over the lower housing portion. The upper and lower housing portions define elongated slots at the lateral sides of the furnace in the closed position of the upper housing portion as well as horizontal entrance and exit openings for the glass at opposite ends of the furnace. The ends of the furnace conveyor rollers project laterally outwardly from the furnace heating chamber through the elongated slots and are positioned above support surfaces outside of the furnace heating chamber. Portions of the furnace conveyor drive chains slide over the support surfaces and have the ends of the furnace conveyor rollers supported thereby so as to provide the frictional driving of the rollers.

The first drive mechanism includes a reversible electric motor that drives chain sheaves of the furnace and load station conveyors adjacent the end of the furnace where glass is indexed from the load station conveyor through the entrance opening of the furnace onto the furnace conveyor. At the other end of the furnace, chain sheaves for the furnace conveyor drive chains are supported by the gas over liquid tightener arrangement. During the portion of the furnace conveyor oscillation when there is a drive tensioning of the furnace conveyor chain portions not engaged by the furnace conveyor rollers, the valving of the tightener arrangement locks liquid within the arrangement so that the frictional roller driving force carried by the tightener arrangement is readily counteracted. During the other direction of oscillation, the gas pressurizes the liquid so that the arrangement resiliently tensions the furnace drive chains. The tightener arrangement is positioned adjacent the horizontal exist opening of the furnace where a heated sheet glass load is indexed from the furnace into the quench unit. As the oscillating sheet glass load in the furnace approaches its quench unit end, it is accelerated upon indexing through the exit opening into the quench unit. Prior to this particular oscillation, the sheet glass load within the quench unit is held in a stationary position ready for indexing so that the furnace and quench unit conveyors are indexed in phase with each other.

The cam arrangements for lifting the load and unload station conveyor rollers utilize cam wheels mounted on fixed framework of the stations and engaged by inclined ramps carried on movable rails. Hydraulic cylinders extending between the fixed framework and the rails are actuated after indexing so as to provide longitudinal movement of the rails and concomitant upward movement thereof due to the cam wheel and ramp engagement in a manner that causes the rails to lift the associated conveyor rollers out of engagement with their respective drive chains. Upon indexing, the cylinders move the rails in the opposite direction to lower the rollers into engagement with their drive chains for the indexing cycle.

BRIEF DESCTIPTION OF THE DRAWINGS

The objects, features and advantages of the present invention are readily apparent from the following detailed description of the preferred embodiment and the drawings in which:

FIG. 3 is an enlarged view of the left-hand portion of FIG. 1 showing a load station of the system;

FIG. 4 is a side elevation view of the load station taken along line 4—4 of FIG. 3;

Figure 2:
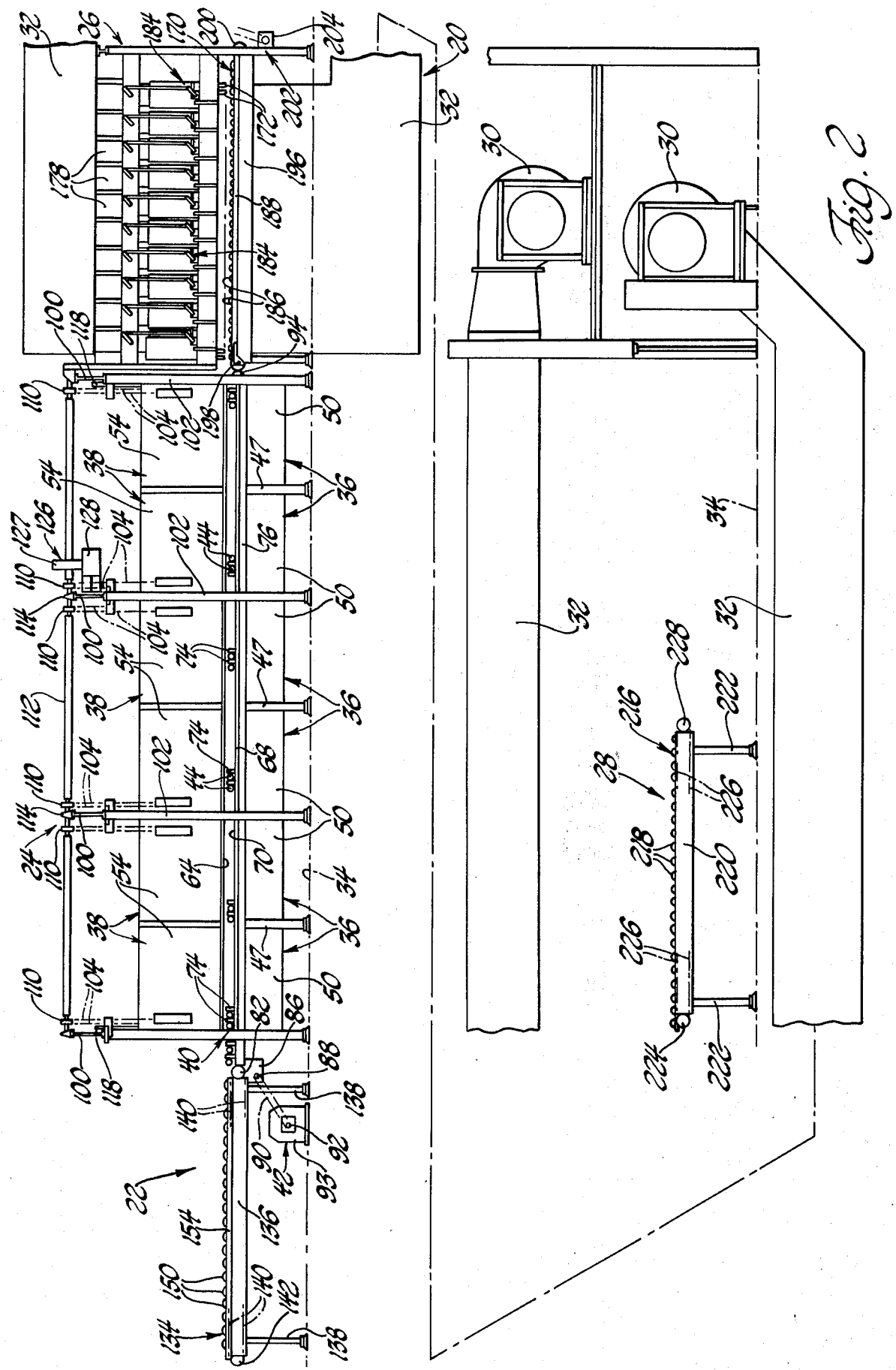
FIG. 2 is a side elevation view of the tempering system taken generally along line 2—2 of FIG. 1.
Figure 6A:
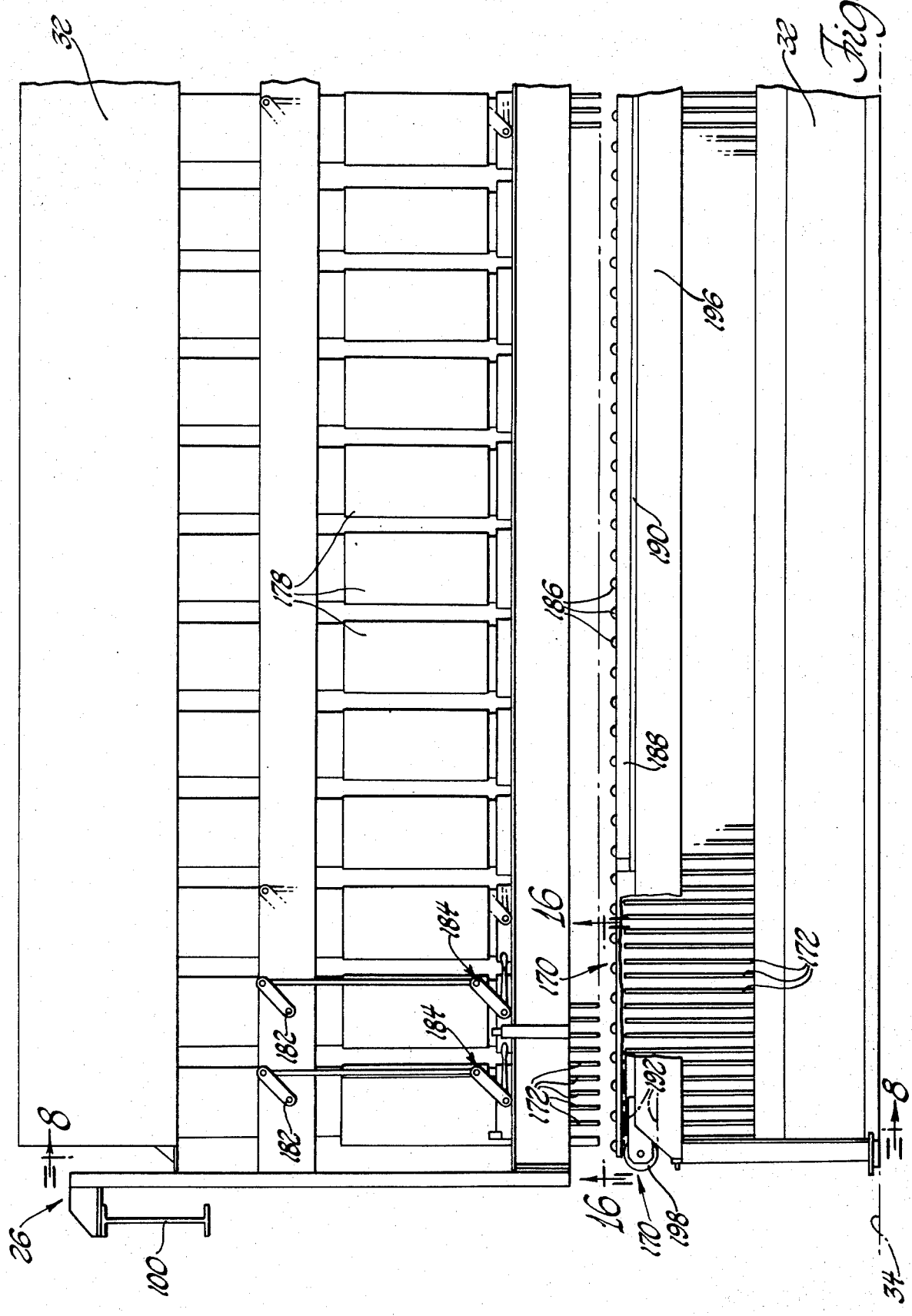
Figure 8:
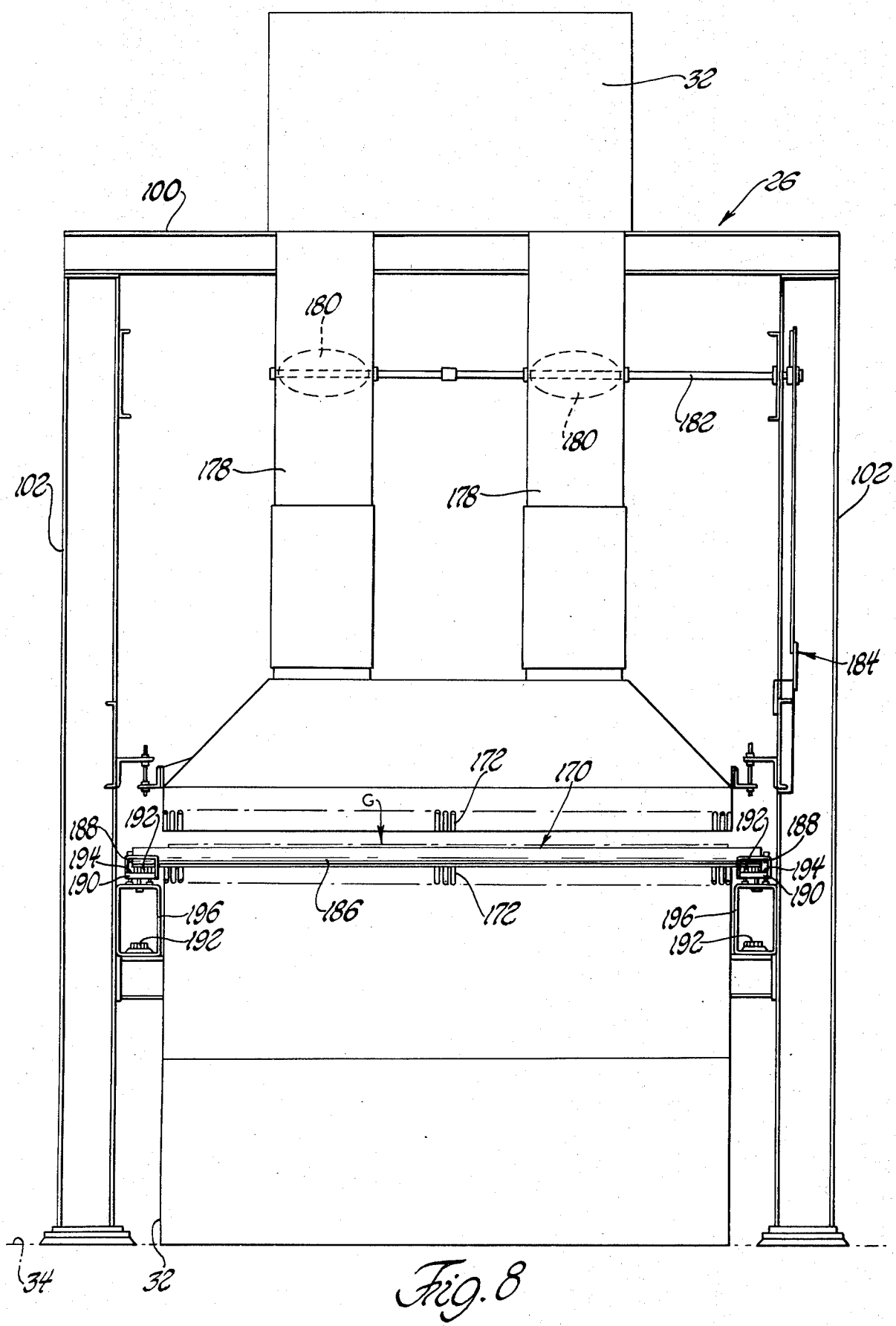
Figure 9:
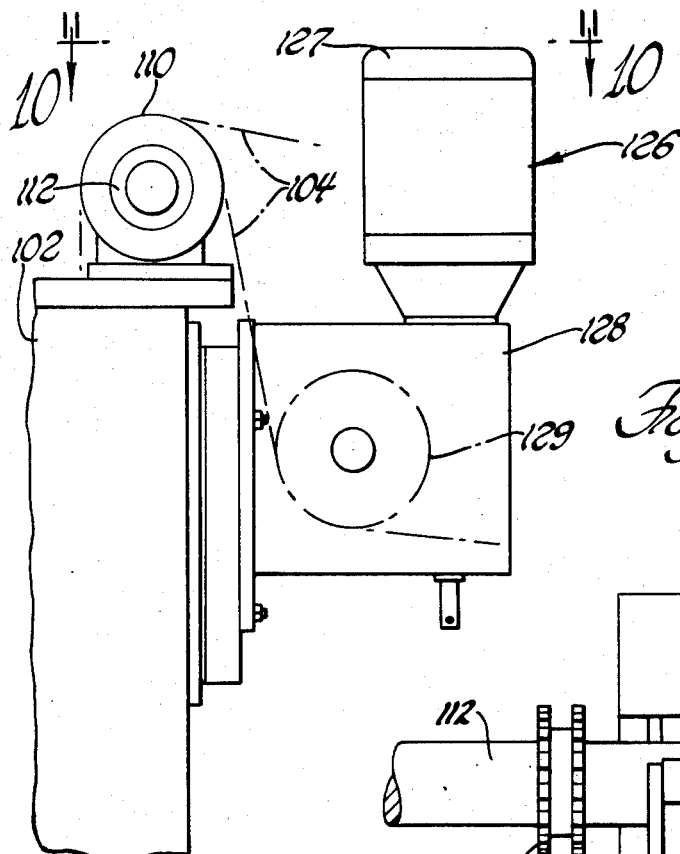
Figure 10:
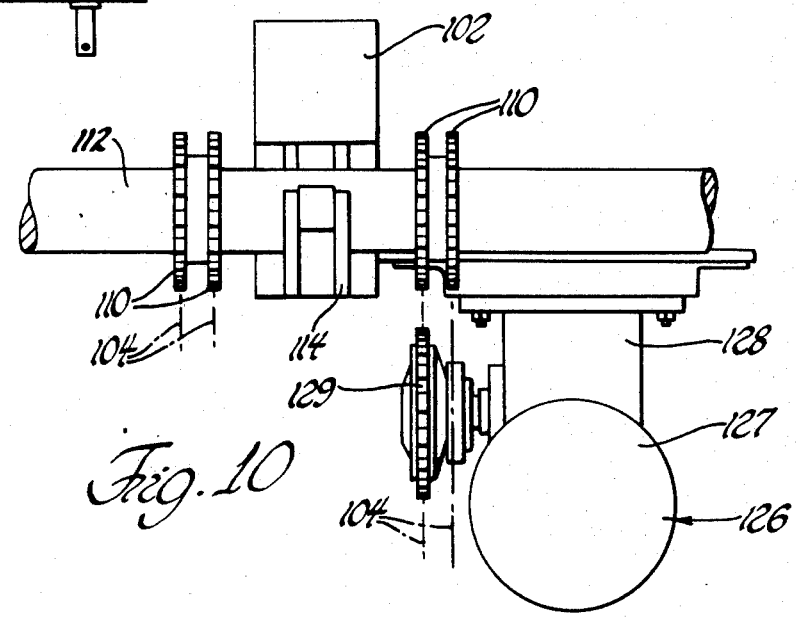
Figure 11:
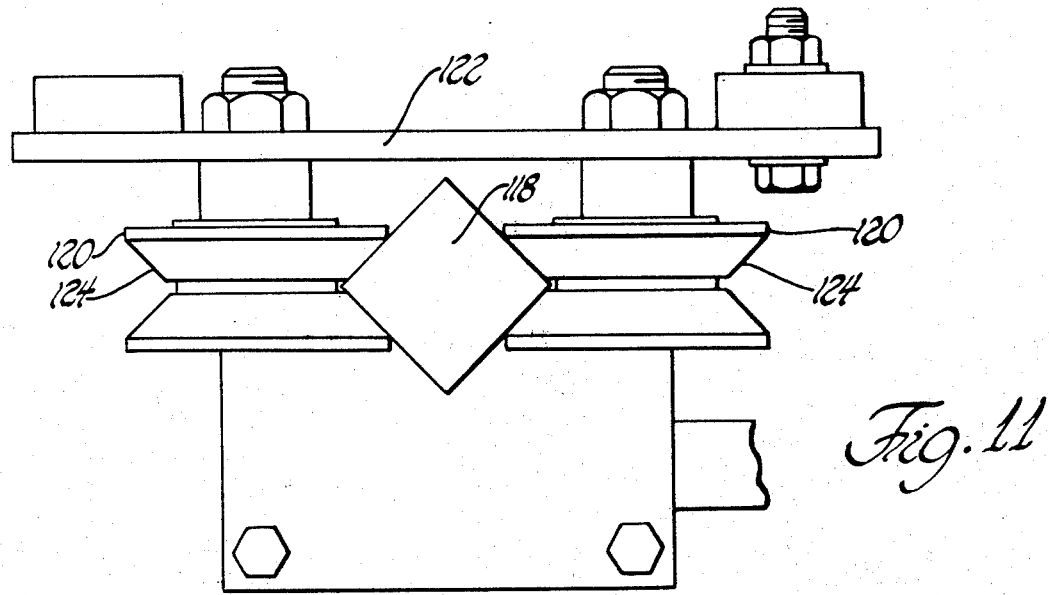
Figure 12:
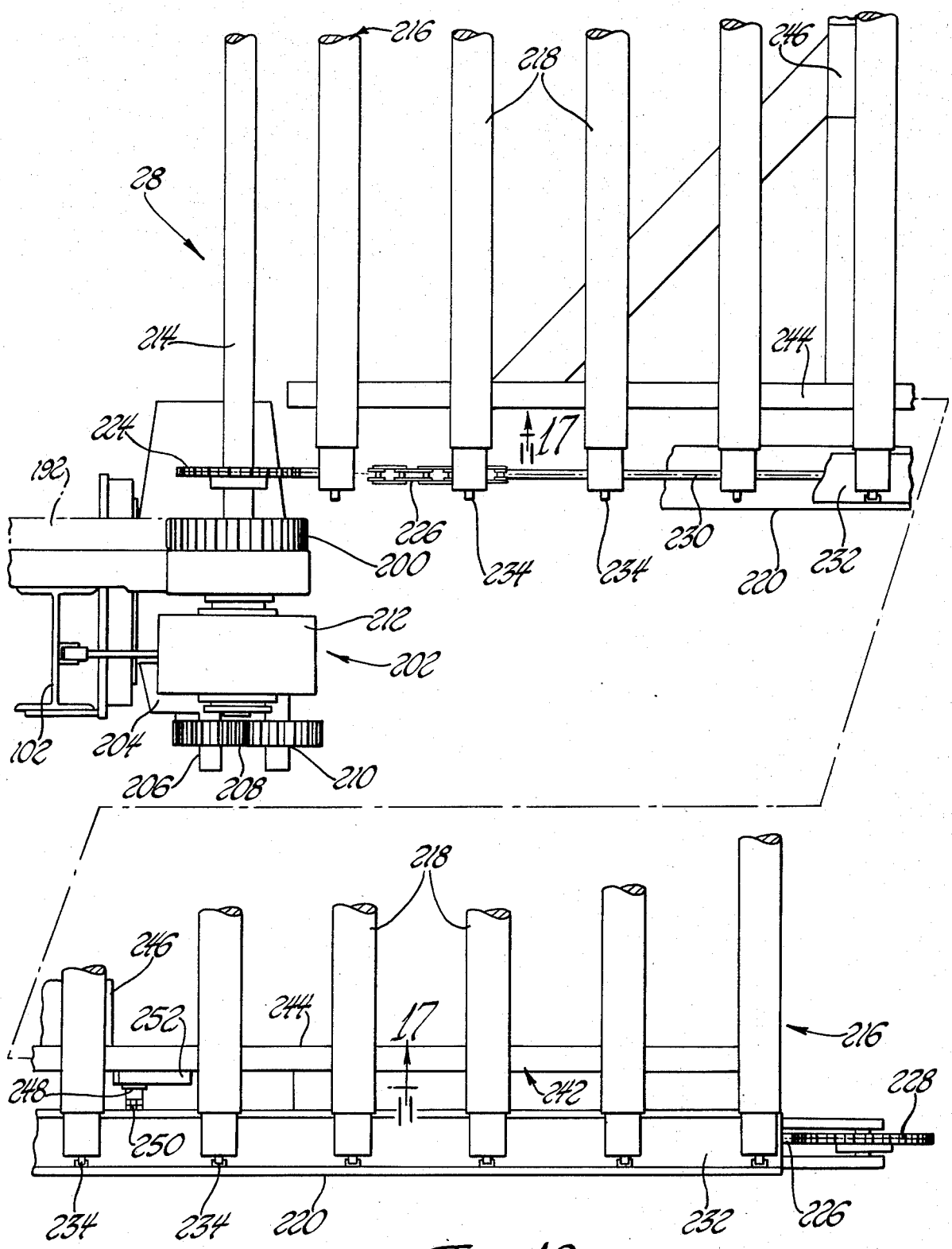
Figure 16:
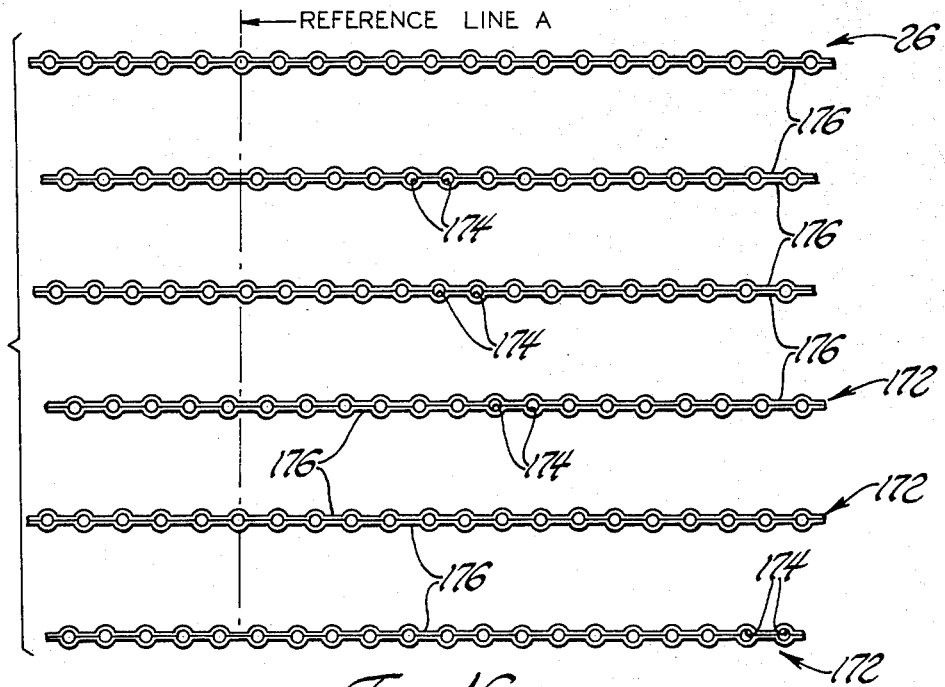
Figure 17:
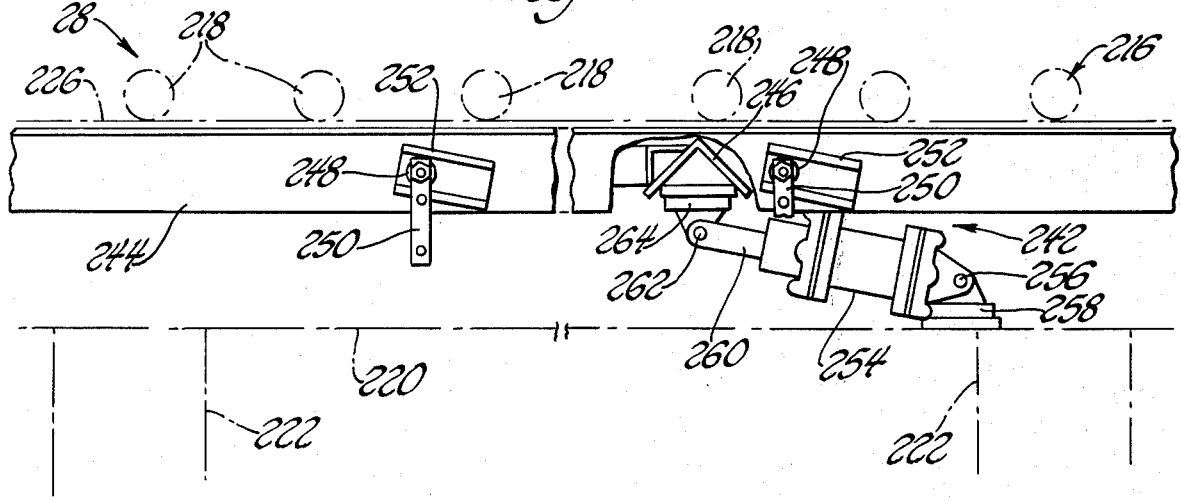

FIG. 5, which includes FIG. 5A and 5B, is an enlarged portion of FIG. 2 showing a furnace of the system;

FIG. 6, which includes FIGS. 6A and 6B, is an enlarged portion of FIG. 2 showing a quench unit and unload station of the system;

FIG. 7 is a cross-sectional view of the furnace taken generally along line 7—7 of FIG. 5A;

FIG. 8 is an end view of the quench unit taken generally along line 8—8 of FIG. 6A;

FIG. 9 is a view taken along line 9—9 of FIG. 5B and shows an electric motor drive assembly for raising and lowering a movable upper housing portion of the furnace;

FIG. 10 is a plan view of the drive assembly taken along line 10—10 of FIG. 9;

FIG. 11 is a view taken along line 11—11 of FIG. 7 and shows a guide arrangement used to guide the movable upper housing portion during its movement;

FIG. 12 is an enlarged top plan view of one lateral side of the unload station taken generally along line 12—12 of FIG. 6B;

FIG. 13 is an end view of the furnace taken along line 13—13 of FIG. 5A;

FIG. 14 is an enlarged cross-sectional view of the load station taken along line 14—14 of FIG. 3;

FIG. 15 is a sectional view taken along line 15—15 of FIG. 14;

FIG. 16 is a bottom plan view taken along line 16—16 of FIG. 6A;

FIG. 17 is a partially broken away side elevation view of the unload station taken along line 17—17 of FIG. 12; and FIG. 18 is a schematic view illustrating the interconnected operation of conveyors for the load station, the furnace, the quench unit, and the unload station.

DETAILED DESCRIPTION OF THE PREFERRED EMBODIMENT

Figure 1:
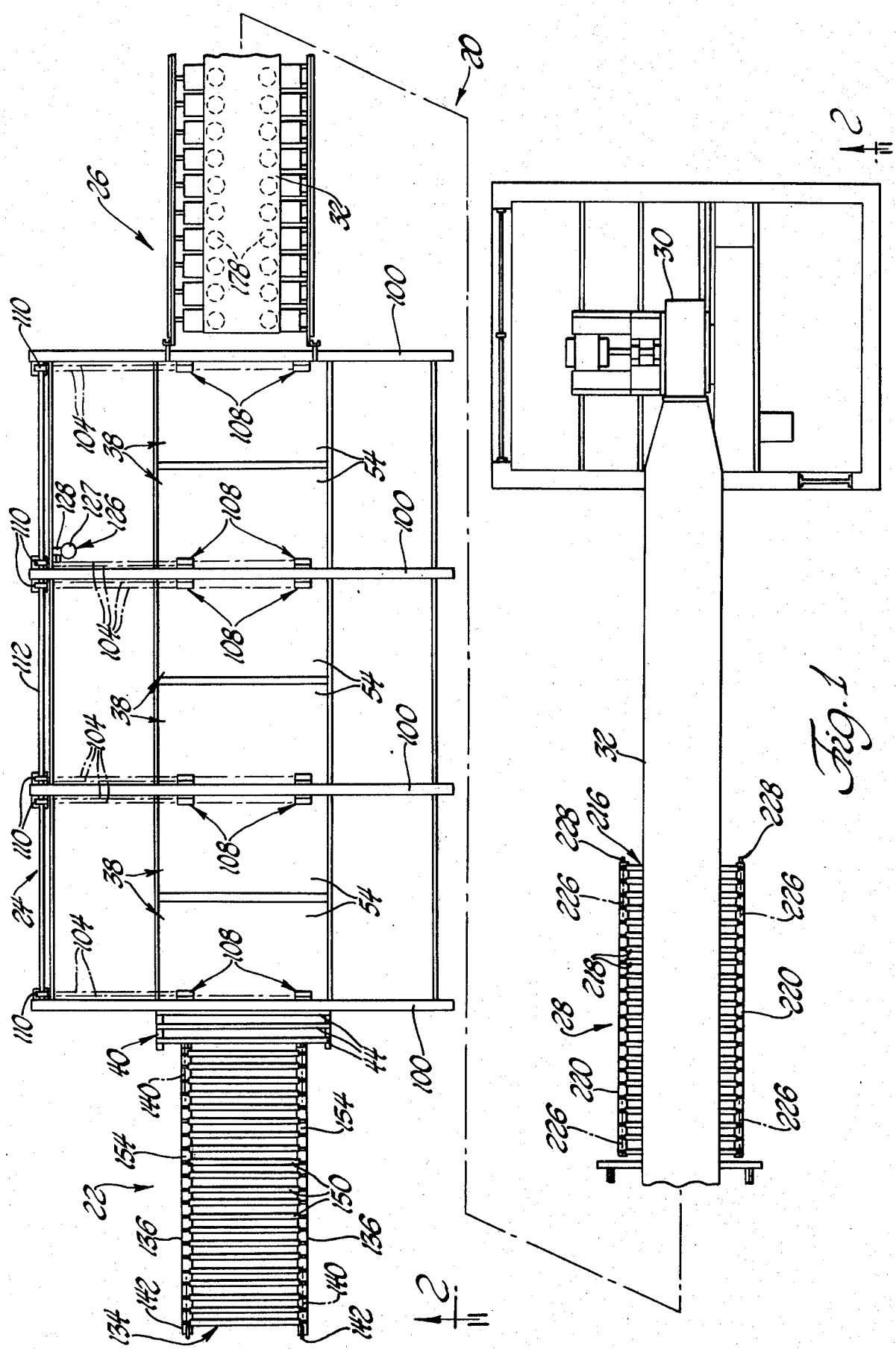
FIG. 1 is a top plan view of a glass tempering system embodying the invention.

Referring to FIGS. 1 and 2 of the drawings, a glass tempering system embodying the invention is collectively indicated by reference numeral 20 and is operable to temper a sheet glass load which may consist of one or more sheets of glass. The tempering system includes a load station 22, a furnace 24, a quench unit 26, and an unload station 28. A sheet glass load is loaded at the load station 22 and may be indexed into the furnace 24 for heating at the same time as heated sheet glass load is indexed from the furnace to the quench unit 26. Blowers 30 of the quench unit supply quenching air through upper and lower ducts 32, the lower one being located below the floor 34 to supply air from the lower side and the upper one being positioned above the rest of the quench unit to supply air from the upper side. A tempered sheet glass load in the quench unit 26 may be indexed therefrom to the unload station 28 at the same time a heated sheet glass load is indexed into the quench unit from the furnace. The tempered sheet glass load is removed from the unload station by operators after indexing and another glass load to be tempered is loaded at the load station. The tempering system is then ready for another index cycle after the glass in the furnace has been heated and the glass in the quench unit has been quenched and cooled to a handling temperature.

With reference to FIGS. 5A, 5B and 7, the furnace 24 is of a modular construction including six modules which each have a fixed lower housing portion 36 and a movable upper housing portion 38. Each furnace module is 6 feet long to give the furnace a total length of 36 feet. At the juncture between the lower and upper housing portions 36 and 38, a horizontal roller conveyor 40 conveys a sheet glass load G, FIG. 7, as wide as 80 inches and preferably no longer than 12 feet within the furnace. The conveyor is driven by a drive mechanism 42, FIG. 5A, and includes elongated rollers 44 composed of silica on which the glass is conveyed within an elongated heating chamber 46, FIG. 7, defined by the furnace housing portions. The drive mechanism 42 drives the rollers 44 in an oscillating manner, first in one direction and then in the other for the same extent of rotation, so that a sheet glass load that has been indexed into the furnace for heating is conveyed between the opposite ends of the chamber in an end-for-end oscillating manner. Each portion of the glass is supported by a plurality of the rollers during each half cycle of the oscillation. The oscillation of the glass permits it to be moved fast enough to prevent sagging of the heated glass between the rollers while still maintaining the furnace length reasonably short. Preferably, the glass is conveyed at a rate of about 50 feet per minute during its oscillation so that there is no sagging between rollers spaced about 4 to 6 inches apart when the glass reaches a quench temperature of approximately 1200° F. The number of times the conveyor rollers 44 must be reversed during heating of the glass for any given length of the furnace is minimized by the glass oscillation between the opposite ends of the furnace. Likewise, the number of times that the glass comes to a stationary condition upon reversal where sagging is possible is also minimized for a given length of the furnace.

The length of the glass oscillations within the furnace 24 is greater than the length of the sheet glass load being heated. This prevents any conveyor roller 44 from being constantly engaged with the glass. Such constant engagement could cause a conductive heat flow from the roller to the glass and lower the temperature of the roller below that of the other rollers. The "cold" roller would then affect the uniformity of the glass temperature and the resultant quality of the tempered glass. Preferably, the length of the oscillations in the furnace is at least twice the length of the sheet glass load, i.e. 24 foot oscillations for a 12 foot long glass load. Consequently, there are time periods during the oscillations when each roller is disengaged from the glass load and heated without any conductive heat flow to the glass. This heating causes all of the rollers to be at a uniform temperature when first engaged by the oscillating glass.

With reference to FIGS. 7 and 13, each lower housing portion 36 is supported on the floor 34 by vertical legs 47 and a plurality of cross beams 48 extending between the legs. A corrugated shell 50, FIG. 7, of the lower housing portions has a U-shaped cross-section and receives fire bricks 52 that define an upwardly opening configuration. The upper housing portions 38 open downwardly with a semicircular cross-section and include an outer shell 54, an intermediate layer of insulation 56, and an inner layer of refractory material 58. Inwardly extending T-shaped projections 60 of the refractory material receive electric heater elements 62 that heat the glass G as it is oscillated within the heating chamber 46. Preferably, the heat input supplied to heater elements 62 along the length of the heating chamber is variable so that the glass is heated uniformly during its oscillation. The heater elements at the central portion of the furnace which heat the full length of a sheet glass load during each half oscillation thereof transfer more heat than the heater elements at the ends of the furnace which only heat a portion of the length of the sheet glass load during each half oscillation in order to achieve the uniform heating. Although it is not shown in the drawings, stop pins on the housing portions 36 or 38 are received within generally V-shaped slots in the outer housing portions to positively locate the upper housing portions 38 in the lower closed position shown in FIG. 7. The upper housing portions 38 may also be moved vertically to an upper open position, in a manner that will be subsequently described, to permit access to the interior of the furnace from both of its lateral sides.

With continuing reference to FIG. 7, lower and upper housing portions 36 and 38 define elongated slots 64 at each lateral side of the furnace when the upper housing portions are in the lower closed position. The furnace conveyor rollers 44 extend transversely through the furnace heating chamber 46 and outwardly through the slots 64 so that their ends are located externally with respect to the furnace. Upper and lower heat seals 66 are carried by the housing portions and include semicircular openings, not shown, that receive the conveyor rollers 44 so as to seal the slots 64 through which the rollers project. The heat seals 66 are adjustable longitudinally with respect to the furnace as well as vertically to permit adjustment of the conveyor rollers 44, in a manner that will be described later, so as to maintain a true horizontal plane over which the glass is conveyed in a straight line path of movement within the furnace. The ends of each conveyor roller 44 are positioned over a respective support member 68 that defines an upwardly facing horizontal support surface 70 extending alongside the adjacent slot 64 between the housing portions. A pair of continuous drive chains 72 of the furnace conveyor have upper portions that are slidably driven over the support surfaces 70 with the ends of the conveyor rollers 44 supported on their upper sides. Positioning members 74 extend upwardly from the support members 68 between the ends of the conveyor rollers, FIGS. 5A and 5B, to prevent longitudinal movement thereof with respect to the furnace as the drive chains slide along the support surfaces 70. Consequently, the sliding drive chain movement provides a frictional drive force that rotates the conveyor rollers 44 to provide the conveyance of glass within the furnace. The support members 68 are mounted on tubular members 76 through which lower portions of the drive chains are slidably moved, FIG. 7. This mounting is preferably accomplished by push and pull bolts so as to permit vertical and longitudinal adjustment of the support members 68 in a manner that adjusts the position of the ends of the conveyor rollers 44, as previously mentioned.

With reference to FIGS. 5A and 5B, the left-hand end of furnace 24 defines a horizontal entrance opening 78 through which a sheet glass load to be heated is indexed into the furnace onto the furnace conveyor 40. The right-hand end of the furnace defines a horizontal exit opening 80 through which the furnace conveyor indexes a heated sheet glass load at an accelerated rate of about 150 feet per minute into the quench unit 26 for its tempering quench. This accelerated movement prevents warpage between the leading end of the glass as it is cooled by quenching gas in the quench unit and its hot trailing end still in the furnace. It is also possible for the quenching gas in the quench unit to be turned off until the sheet glass load is indexed completely into the quench unit and then turned on to provide tempering in a manner that also prevents warpage between the leading and trailing ends of the glass.

Adjacent the entrance opening 78 of the furnace, the furnace drive chains 72 are respectively trained over a pair of chain sheaves 82 of the drive mechanism 42. An output shaft 84 of the drive mechanism, see also FIG. 3, is driven by a speed reducing gear unit 86 whose input sheave 88 is driven by a continuous drive chain 90 off of the output sheave 92 of a reversible electric motor 93. Adjacent the exit opening at the opposite end of the furnace from drive mechanism 42, FIG. 5B, the drive chains 72 are respectively trained over a pair of chain sheaves 94 associated with opposite sides of the furnace, only one of these chain sheaves being shown. A hydraulic tightener arrangement 96 mounts each chain sheave 94 to maintain the drive chains 72 in a properly tensioned condition. The tightener arrangement includes a retractable and extendable hydraulic cylinder 98 extending between the furnace and the chain sheaves 94 to provide a resilient biasing force thereon to the right that provides the chain tension. This tensioning prevents the chain links from folding and maintains them in an aligned relationship with each other. Cylinder 98 is of the gas over liquid type wherein a pressurized head of air pressurizes oil within the cylinder to cause resilient extension thereof that tensions chains 72. Flow of the oil out of the cylinder to cause retraction thereof is prevented by a valving action, that will be hereinafter described, during sliding movement of the upper portions of drive chains 72 along the support members 68 from the left to the right. The chain tension adjacent sheaves 94 during this direction of the oscillation is very large and is readily counteracted by the incompressible oil locked within cylinder 98, which would not be the case if this large tension had to be counteracted by the compressible air. During the opposite direction of conveyor oscillation, the valving action of cylinder 98 permits the pressurized air to pressurize the oil within the cylinder and thereby resiliently position the chain sheaves 94 in the location that properly tensions the drive chains 72. This is possible since the chain sheaves 94 support the slack side tension of the chains 72 during this latter direction of the oscillation and do not carry the frictional driving force for the conveyor rollers as is the case in the other direction of oscillation.

The upper housing portions 38 are fixedly secured with respect to each other during assembly in any suitable manner and are located below a plurality of cross beams 100 extending between the upper ends of vertical support beams 102, see FIG. 7. At longitudinally spaced positions along the furnace, pairs of support chains 104 extend between chain sprockets 106 mounted on the cross beam 100 and on the upper housing portions 38 so as to provide block and tackle arrangements 108. The support chains 104 extend from the block and tackle arrangements to the left and over respective chain sprockets 110, see also FIGS. 5A and 5B, on an elongated control shaft 112. The control shaft 112 is rotatably supported on the horizontal cross beams 100 and the vertical beams 102 by a plurality of journals 114. The pairs of support chains 104 extend downwardly from their respective chain sprockets 110 for attachment to counterweights 116 that permit vertical movement of the upper housing portions 38 in a counterbalanced manner. The upper side of the housing portions 38 mount the lower ends of vertical guides 118 whose upper ends are received between respective pairs of roller guides 120. The roller guides 120 are mounted on the cross beam 100 by a bracket 122 suitably affixed thereto and, seen in FIG. 11, may have V-shaped grooves 124 that receive the corners of the square cross-sectional configuration of their respective guide.

With reference to FIGS. 5B, 9 and 10, an electric motor drive assembly 126 is used to raise and lower the upper housing portions 38 between their upper open position and their lower closed position. The drive assembly includes a reversible electric motor 127 that drives a speed reducing gear unit 128 mounted on one of the vertical beams 102 as best seen in FIG. 10. The output of gear unit 128 drives a chain sprocket 129 over which one of the support chains 104 is trained. Motor rotation in one direction drives the one support chain to raise the upper housing portions and motor rotation in the opposite direction lowers the upper housing portions. The elongated control shaft 112 that mounts the chain sprockets 110 over which each support chain 104 is trained coordinates the movement of the interconnected upper housing portions so that they remain in a horizontal attitude during upward and downward movement. An actuator handle 130 for the drive assembly, see FIG. 7, is mounted by a link 131 for upward and downward movement to move a control rod 132 upwardly or downwardly. The control rod 132 actuates a switch 133 that energizes the motor 127 for upward driving of the housing portions upon upward handle movement and for downward driving upon downward movement of the handle. A spring 133' normally positions the control rod and handle at an intermediate vertical position where the motor 127 is de-energized. Preferably, the handle 130 is elongated and extends along the length of the furnace so an operator can manipulate the handle from any position along the furnace length.

With reference to FIGS. 3 and 4, the electric drive mechanism 42 that drives the furnace conveyor 40 also drives a horizontal roller conveyor 134 of the load station 22 during indexing of a sheet glass load into the furnace 24. The load station includes a table having longitudinal tubular support members 136 at each side thereof mounted on vertical legs 138. A pair of continuous drive chains 140 of the load station conveyor are respectively associated with the opposite lateral sides thereof and are trained over a pair of chain sheaves 142 at the end of the load station away from the furnace as well as over a pair of chain sheaves 144 carried by the output shaft 84 of drive mechanism 42 at the end of the load station adjacent the furnace. The upper portions of drive chains 140 are slidably moved along elongated slide projections 146 that extend upwardly from the support members 136 in a manner illustrated by FIG. 14. The lower portions of the drive chains 140 move within the support members 136 along elongated slide projections 148. Elongated conveyor rollers 150 of conveyor 134 extend transversely with respect to the elongated direction of the glass tempering system and have their opposite ends received within respective semicircular openings 152, FIG. 15, of steel chain covers 154. The chain covers 154 are mounted on the upper side of the support members 136 as best seen in FIG. 14 and include vertical positioning flanges 156 that define vertical slots receiving pins 158 projecting from the ends of the conveyor rollers 150.

During an index cycle of glass tempering system 20, the rollers 150 of load station conveyor 134 are permitted to engage the upper portions of drive chains 140 in the manner shown by FIG. 14. During this index cycle, these upper portions of the drive chains 140 are moving away from the furnace and, therefore, impart a frictional driving force that rotates the rollers in a direction causing conveyance of a sheet glass load supported thereby toward the furnace. Since the furnace conveyor 40 is driven by the same drive mechanism 42 as the load station conveyor, the sheet glass load is conveyed in a smooth manner from the end of the load station conveyor onto the furnace conveyor and then through the horizontal entrance opening 78 into the furnace. However, during the oscillation of the sheet glass load within the furnace during its heating, the load station conveyor rollers 150 are lifted upwardly off their drive chains 140, in a manner that will be more fully hereinafter described, so as to remain stationary and permit another sheet glass load to be loaded in preparation for another index cycle. The drive chains 140, nevertheless, are driven in an oscillating manner by the drive mechanism 42 as it drives the furnace conveyor 40 to oscillate a sheet glass load being heated.

One of the load station drive chains 140 includes one or more dogs 160, FIGS. 4 and 14, for engaging upwardly extending arms 162 of a plurality of limit switches 164. An elongated channel member 166 is mounted on the adjacent support member 136 by brackets 168 and adjustably positions the limit switches 164 longitudinally with respect to the load station. The dogging actuation of switches 164 controls drive mechanism 42 to commence and terminate an index cycle, to reverse the direction of oscillation during glass oscillation within the furnace, and to also accelerate and decelerate the furnace conveyor during the reversals of the direction of movement. The adjustable positioning of the switches permits control of the extent of oscillation and the locations at which indexing commences and terminates, etc. Preferably, the glass is accelerated and decelerated at a maximum rate of 1/10 g to prevent large frictional forces from developing between the glass and the furnace conveyor rollers 44 in a manner that could cause sliding therebetween and possible scoring damage to the glass. Also, an oscillating sheet glass load within the furnace is preferably accelerated from its rate of oscillating movement of about 50 feet per minute as it approaches the exit opening 80, FIG. 5B, at the right-hand end of the furnace to an index speed of about 150 feet per minute. Thus, as previously mentioned, this accelerated movement is fast enough to prevent warping of the glass as its leading end enters the quench unit while its trailing end is still within the hot furnace.

With reference to FIGS. 6A, 6B and 8, a horizontal roller conveyor 170 of quench unit 26 conveys a heated sheet glass load between upper and lower banks of nozzles 172. As illustrated by the upper nozzle bank 172 in FIG. 16, the nozzle openings 174 for quenching air are defined by stamped pieces of sheet metal 176 that are welded to each other. Reference Line A, which is parallel to the elongated direction of the glass tempering system, illustrates the staggered manner in which the nozzle openings 174 are positioned so as to insure proper distribution of the quenching air flow onto a sheet glass load being quenched. The upper and lower quench unit blowers 30, FIG. 2, that respectively provide quenching air flow to the upper and lower banks of nozzles 172 are individually adjustable to control the mass flow rate of air supplied to their associated banks of nozzles. Preferably, there is a slightly greater back pressure due to limited exhaust area for the upper nozzles so as to maintain the glass being quenched in engagement with the quench unit conveyor 170 and to thereby prevent any vibratory movements due to the upwardly directed flow of quenching air. In this connection, the upper flow of quenching air is fed downwardly from the upper duct 32 through longitudinally spaced pairs of round ducts 178, FIG. 8, whose flow is controlled by dampers 180 carried by associated control shafts 182 of manually adjustable control linkages 184. In one mode of operation, blowers 30 that supply quenching air to the ducts 32 and hence to the nozzles 172 are turned off prior to the indexing and turned on after the glass is fully indexed into the quench unit so that the total surface area thereof is simultaneously quenched. This operation, like the accelerating glass movement upon indexing when quenching gas flows continuously, prevents warpage between the leading and trailing ends of glass sheets being quenched.

As seen in FIGS. 6A, 6B and 8, the quench unit conveyor 170 includes a plurality of elongated rollers 186 that extend transversely with respect to the elongated direction of the tempering system. The rollers 186 are preferably composed of silica and have opposite end portions received within semicircular openings in a pair of laterally spaced chain covers 188, in a manner similar to the load station rollers 150 and chain covers 154 previously described in connection with FIGS. 14 and 15, so as to be positioned longitudinally with respect to the quench unit. As seen in FIG. 8, the chain covers 188 are mounted on a pair of laterally spaced support members 190 in any suitable manner and enclose upper portions of a pair of drive chains 192 that are slidably moved along upwardly facing support surfaces 194 of the support members. The ends of the rollers rest on the upper sides of the chains 192 so that the frictional engagement therebetween provides a driving force that rotates the rollers during the sliding chain movement. Lower portions of the chains 192 are slidably moved within tubular members 196 on which the support members 190 are mounted, preferably in an adjustable manner by push-pull bolts that permit vertical and longitudinal adjustment thereof in the same manner as the furnace conveyor 40 previously described. The quench unit conveyor chains 192 are respectively trained over a pair of chain sheaves 198, only one being shown in FIG. 6A, respectively associated with opposite lateral sides of the quench unit. Likewise, the quench unit drive chains are also trained over a pair of chain sheaves 200, only one being shown in FIG. 6B, respectively associated with opposite lateral sides of the quench unit at its other end.

A second electric motor drive mechanism 202, FIG. 6B, adjacent one of the quench unit chain sheaves 200 includes a reversible electric motor 204 having an output shaft and sheave arrangement 206 that drives a continuous drive chain 208. An input shaft and sheave arrangement 210 of a speed reducing gear unit 212 is driven by drive chain 208. Gear unit 212 has an output shaft 214, FIG. 12, that carries the quench unit chain sheaves 200. The electric motor drive mechanism 202 drives chain sheaves 200 so as to provide an oscillatory movement of the quench unit drive chains 192 in a manner that oscillates a sheet glass load being quenched within the quench unit. The quenching air is thus distributed uniformly over the sheet glass load due to this oscillatory movement at the same time the furnace conveyor oscillates a sheet glass load being heated. Drive mechanism 202 also indexes the quench unit conveyor 170 so as to receive the heated sheet glass load from the quench unit and to also convey a tempered sheet glass load from the quench unit to the unload station 28. During this indexing, the drive mechanism 202 is electrically coupled with the drive mechanism 42 for the furnace conveyor to insure the smooth flow of glass between the furnace and the quench unit.

With reference to FIGS. 6B and 12, the unload station 28 of the tempering system includes a horizontal roller conveyor 216 including elongated rollers 218. Each lateral side of the unload station includes an elongated support member 220, only one shown, mounted on the floor 34 by vertical legs 222. The output shaft 214 of drive mechanism 202 carries a pair of chain sprockets 224, only one shown, associated with opposite lateral sides of the unload station conveyor in alignment with its support members 220. A pair of continuous drive chains 226 associated with the opposite lateral sides of the unload station are respectively trained over the chain sprockets 224 and a pair of chain sprockets 228 at the other end of the unload station. Each support member 220 supports an upwardly extending slide projection 230 over which upper portions of drive chains 226 are slidably movable upon driving rotation of the chain sprockets 224 by drive mechanism 202. The slide projections and upper portions of the chains are enclosed within covers 232 of an identical construction to the covers 154 of the load station conveyor described in connection with FIG. 14. The rollers 218 include central pins 234 at their ends which are received between vertical positioning flanges of the covers 232 in the same manner as the load station conveyor rollers 150 so as to be positioned longitudinally with respect to the tempering system. During indexing of the tempering the rollers 218 are lowered into engagement with the upper portions of drive chains 226 so as to be driven in a frictional manner to receive a tempered sheet glass load being indexed out of the quench unit 26. During oscillation of glass within the quench unit after indexing, the unload station rollers 218 are lifted off the chains 226 and thus remain stationary to permit operators to remove the tempered sheet glass load from the unload conveyor. The drive chains 226 are driven in an oscillating manner along with the quench unit conveyor 170 by the drive mechanism 202 as the unloading proceeds.

With reference to the schematic view of FIG. 18, one of the drive chains 226 of the unload station conveyor 216 includes one or more dogs 236 for actuating switch arms 238 of a plurality of switches 240 during movement of the chains. These switches are adjustably mounted like the switches 164 of the load station conveyor and actuation thereof is used to reverse the direction of rotation of drive motor 204, to accelerate and decelerate the motor during such reversals, and to commence and terminate an index cycle. The load and unload station conveyors 134 and 216 are also shown in the schematic view as having hydraulically actuated rail arrangements 242 for lifting and lowering their conveyor rollers into and out of engagement with their associated drive chains. As previously mentioned, the rail arrangements 242 lower the load station rollers 150 and unload station conveyor rollers 218 into engagement with the drive chains during the index cycle and lift them out of engagement with the chains during the oscillation of glass within the furnace 24 and quench unit 26.

FIGS. 12 and 17 show the unload station conveyor rail arrangement 242 which is of the same construction as the load station rail arrangement 242 shown schematically in FIG. 18. As seen by particular reference to FIG. 12, the unload station rail arrangement includes an elongated rail 244 at one lateral side of the unload station conveyor below the adjacent ends of the conveyor rollers 218. A pair of cross members 246 extend between this rail 244 and another elongated rail at the other lateral side of the conveyor below the other ends of the conveyor rollers 218. As seen by particular reference to FIG. 17, a pair of cam wheels 248 are fixedly mounted on the adjacent support members 220 by respective brackets 250. The cam wheels 248 are respectively received by a pair of channel shaped ramps 252 fixedly mounted on the rail 244 in an inclined orientation. As shown, the cam wheels 248 are located at the upper ends of the ramps 252 so the rail 244 is in a lowered position that permits the conveyor rollers 218 to engage their respective drive chains. A hydraulic cylinder 254 is pivoted by a pin 256 to a bracket 258 that is fixedly mounted with respect to the framework provided by the support member 220 and vertical legs 222. The cylinder 254 includes a piston having a connecting rod 260 pivoted by a pin 262 to a bracket 264 fixedly mounted on the lower side of the adjacent cross member 246. Cylinder 254 is fed a pressurized fluid so as to extend its connecting rod 260 during the oscillating movement of sheet glass loads within the furnace and quench unit. This cylinder extension shifts rail 244 to the left so cam wheels 248 move to the lower ends of ramps 252 and concomitantly lift the rail upwardly to raise the rollers 218 out of engagement with the chains 226. The rollers 218 then remain stationary even though the drive chains are moving. During an index cycle, the piston rod 260 of cylinder 254 is fed a pressurized fluid so that the rail 244 is shifted back to the right and thereby lowered as the cam wheels move to the upper ends of the ramps. Engagement of the conveyor rollers 218 with the drive chains for driving rotation in the index mode then takes place.

With reference to FIG. 18, a central electrical control panel 266 of the tempering system is connected by conduit bundles 268 and 269 to motor control circuits 270 and 271 having suitable relay circuitry. The motor control circuit 270 is connected by a conduit bundle 272 to the electric motor 93 of drive mechanism 42 which drives the load station and furnace conveyors 134 and 40, respectively. The motor control circuit 271 is connected by a conduit bundle 273 to the electric motor 204 of drive mechanism 202 which drives the quench unit and unload station conveyors 170 and 216, respectively. Conduit bundles 274 and 275 respectively connect the control panel 266 to the switches 164 of the load station 22 and the switches 240 of the unload station 228. The switch actuation sensed at the load and unload stations is thus used to control the oscillation of the drive motors 93 and 204, and the control panel 266 electrically couples these drive motors during the index cycle so that a heated sheet glass load flows smoothly between the mechanically uncoupled furnace and quench unit conveyors 40 and 170. Prior to the electrically coordinated indexing of conveyors 40 and 170, drive mechanism 202 is momentarily deenergized so conveyor 170 is ready for the commencement of indexing as conveyor 40 executes its last oscillation of glass within the furnace.

As seen by continued reference to FIG. 18, conduit bundles 276 and 277 connect the control panel 266 to electrically controlled sources of fluid pressure 278 that feed the cylinders 254 of the rail arrangements 242 through conduits 279. The fluid sources 278 are electrically actuated to lower the rails 244 of these arrangements during an index cycle to permit engagement of their associated rollers with the associated drive chains so as to cause roller rotation that permits the indexing of sheet glass loads in the manner that has been described. The control panel 266 is also connected by a conduit bundle 280 to a solenoid 282 of the tightener arrangement 96 for the furnace conveyor chains 72. This solenoid controls the open or closed condition of a valve 284 that controls the flow of oil 286 into and out of the tightener cylinder 98. The oil is received within a closed receptacle 288 below a head of pressurized air fed by a pump 290. The solenoid 282 closes valve 284 when the chain sheaves 94 carried by the tightener arrangement are rotating clockwise so that the chain portions adjacent to those chain sheaves are tensioned with the frictional driving force for driving the conveyor rollers 44. The chain sheaves 94 must be positioned with a large force equal to twice the combined tensions of each chain (both the upper and lower portions of the chains carrying this frictional force must be counteracted) and the closing of valve 284 locates the piston 296 of cylinder 98 against movement by the incompressible oil so as to counteract this force. During the other direction of chain sheave rotation, the solenoid 282 opens valve 284 so that the head of pressurized air supplied by pump 290 pressurizes oil 286 an appropriate amount such that cylinder 98 locates the chain sheaves 94 to resiliently tension their associated drive chains 72.

The control panel 266 shown in FIG. 18 is also connected by a wire conduit bundle 298 to the heater elements 62 in furnace 24. Individual heater elements 62 along the length of the furnace are electrically connected by respective wires, not shown, of bundle 298 so the control panel may supply a variable heat input to furnace 24 along its length. This variable heat input, as previously mentioned, permits the glass to be heated to a uniform quench temperature along its length. Thus, if it is observed that this temperature is not uniform, appropriate adjustments can be made to again achieve the temperature uniformity.

Continuous steel drive belts may be used in place of the drive chains shown by the drawings.

While a preferred embodiment has been described, those skilled in the art will recognize various alternative embodiments of the invention as described by the following claims.

What is claimed is:
1. A glass tempering system comprising:
a furnace including a housing defining a horizontally elongated heating chamber; a furnace conveyor including a plurality of elongated rollers spaced along the elongated length of the chamber extending transversely with respect thereto in a horizontal manner so as to support a sheet glass load within the chamber in a horizontal orientation; a furnace conveyor drive mechanism that alternately rotates the rollers in one direction and then in the other for the same extent of rotation so as to convey the sheet glass load between the opposite ends of the chamber in an end-for-end oscillating manner; heating means for heating the sheet glass load to a quench temperature during the oscillating movement thereof between the ends of the chamber; said oscillating movement being at a sufficient speed and engaging each portion of the glass load with a plurality of the rollers such that there is no sagging of heated glass between the rollers; and said drive mechanism having an index cycle that rotates all of the furnace rollers to convey a heated glass sheet glass load out of the furnace or to receive a sheet glass load to be heated;

a quench unit including a horizontal roller conveyor having an index cycle for receiving a heated sheet glass load from the furnace and including means for quenching the heated glass load to provide tempering thereof; and control means for coupling the furnace conveyor drive mechanism during the index cycle thereof with the roller conveyor of the quench unit during the index cycle thereof to provide coordinated sheet glass load conveyance from the furnace to the quench unit; said control means uncoupling the furnace conveyor drive mechanism from the quench unit conveyor after the coordinated index cycles thereof such that the furnace conveyor drive mechanism can oscillate a sheet glass load to be heated within the furnace independently of a sheet glass load being quenched in the quench unit.

2. A system according to claim 1 wherein the length of the oscillating glass load movement in the furnace is greater than the length of the sheet glass load so that no one roller is constantly engaged with the oscillating glass load.

3. A system according to claim 1 wherein the length of the oscillating glass load movement in the furnace is equal to at least twice the length of the sheet glass load so that each roller is disengaged from the oscillating glass load for a period of time to enable the heating means to heat said rollers without any concomitant heat transfer through conduction from the rollers to the glass load.

4. A system according to claim 1 wherein the heat input to the furnace is variable along the length of the heating chamber so as to insure a uniform temperature of the heated sheet glass load along the length thereof, the heat input being greater at the center of the chamber than at the ends thereof.

5. A system according to claim 1 wherein the housing includes a fixed lower portion that opens upwardly, and a movable upper housing portion that opens downwardly in a closed position thereof over the lower housing portion and has a semicircular cross-section that carries the heating means for heating a sheet glass load oscillating between the ends of the chamber, the upper housing portion being movable to an open position to permit access into the heating chamber.

6. A system according to claim 1 wherein the sheet glass load is conveyed at a faster rate during the index cycle than during the oscillating movement.

7. A system according to claim 1 wherein the rollers of the furnace conveyor are spaced about 6 inches from each other and the sheet glass load is oscillated at about 50 feet per minute so glass will not sag between the rollers when heated to 1200° F. quench temperature.

8. a system according to claim 1 wherein the furnace conveyor drive mechanism includes a pair of continuous drive chain means, a pair of horizontal support surfaces at opposite sides of the furnace, a pair of sheaves at each end of the furnace over which the pair of drive chain means are respectively trained so that portions thereof between the sheaves are respectively slidable over the pair of horizontal support surfaces and support the rollers on upper sides thereof, and a reversible electric motor for driving the sheaves at one end of the furnace in opposite directions so as to thereby drive the chain means over the support surfaces in opposite directions and rotate the rollers to oscillate the sheet glass load.

9. A system according to claim 8 wherein the support surfaces slidably supporting the chain means are located externally of the heating chamber on opposite sides of the furnace, the opposite ends of the rollers extending outwardly of the chamber through elongated slots in the housing.

10. A system according to claim 8 wherein the the quench unit includes a drive mechanism for driving the conveyor thereof, and the control means including electrical circuitry for coupling the furnace and quench unit conveyor drive mechanisms during the index cycles and for uncoupling the drive mechanisms after completion of the index cycles.

11. A system according to claim 8 wherein the pair of drive chain means take the form of a pair of continuous drive chains.

12. A system according to claim 1 wherein the oscillating sheet glass load is heated to a quench temperature of about 1200° F, and the furnace conveyor rollers are composed of silica so as to have relatively little roller sagging due to the elevated temperature to which the rollers are heating during the heating.

13. a glass tempering system comprising:

a furnace including a housing defining a horizontally elongated heating chamber and having a pair of horizontal support surfaces; a plurality of elongated rollers spaced along the elongated length of the chamber extending transversely with respect thereto in a horizontal manner so as to support a sheet glass load within the chamber in a horizontal orientation; an electrical drive mechanism for alternately rotating the rollers in an oscillating manner or for an index cycle, the drive mechanism rotating the rollers in one direction and then in the other for the same extent of rotation during the oscillation so as to convey the sheet glass load between the opposite ends of the chamber in an end-for-end oscillating manner; the drive mechanism including a pair of continuous drive chains, a pair of sheaves at each end of the furnace over which the pair of drive chains are respectively trained so that portions thereof between the sheaves are respectively slidable over the pair of horizontal support surfaces and support the rollers on upper sides thereof, and a reversible electric motor for driving the sheaves at one end of the furnace in opposite directions so as to thereby drive the chains over the support surfaces in opposite directions and rotate the rollers to oscillate the sheet glass load; heating means for heating the sheet glass load to a quench temperature during the oscillating movement thereof between the ends of the chamber; said oscillating movement being at a sufficient speed and engaging each portion of the glass load with a plurality of the rollers such that there is no sagging of heated glass between the rollers; and said drive mechanism rotating all of the rollers during the index cycle to convey a heated sheet glass load out of the furnace or to receive a sheet glass load to be heated;

a quench unit having a horizontal roller conveyor including a electrical drive mechanism with an index cycle for receiving a heated sheet glass load from the furnace; and the quench unit also including means for quenching the heated glass load to provide tempering thereof; and control means for electrically coupling the furnace and quench unit drive mechanisms during the index cycles thereof to provide coordinated sheet glass conveyance from the furnace to the quench unit and for uncoupling the furnace conveyor drive mechanism from the quench unit conveyor drive mechanism after the coordinated index cycles thereof such that the furnace conveyor drive mechanism can oscillate a sheet glass load to be heated within the furnace independently of a sheet glass load being quenched in the quench unit.

14. A glass tempering system comprising:

a furnace having a housing including a fixed lower portion and a movable upper portion that opens downwardly with a semicircular cross-section, the upper housing portion having a lower closed position where the housing portions cooperatively define an elongated heating chamber having horizontal entrance and exit openings at opposite ends thereof and elongated slots at the lateral sides thereof, and the upper housing portion being movable vertically in a counterbalanced manner between the lower closed position and an upper open position where access into the furnace is permitted; a pair of horizontal support surfaces respectively extending alongside the slots in the sides of the housing between the ends thereof; a roller conveyor including a plurality of elongated rollers spaced along the length of the heating chamber extending transversely therethrough and outwardly through the slots in the sides of the housing; a drive mechanism for the conveyor including a pair of chain sheaves at each end of the furnace in respective association with opposite lateral sides thereof, a pair of continuous drive chains associated with opposite lateral sides of the furnace and trained over the chain sheaves thereof so that a portion of each chain is slidable over the support surface adjacent thereto, said portions of the chains supporting the adjacent ends of the rollers so that sliding chain movement frictionally drives all of the rollers in the same direction at any given time, and a reversible electric motor for driving the chain sheaves at one end of the furnace in one direction and then the other for the same extent of rotation so as to convey a sheet glass load between the opposite ends of the heating chamber in an end-for-end oscillating manner; heating means on the semicircular upper housing portion for heating the sheet glass load to a quench temperature during the oscillating movement thereof between the ends of the chamber; said oscillating movement being at a sufficient speed and engaging each portion of the sheet glass load with a plurality of the rollers such that there is no sagging of heated glass between the rollers; and said drive mechanism rotating all of the rollers during the index cycle so as to convey a heated sheet glass load out of the furnace through the exit opening and to simultaneously receive a sheet glass load to be heated through the entrance opening;

a quench unit having a horizontal roller conveyor including an electrical drive mechanism with an index cycle for receiving a heated sheet glass load from the furnace; and the quench unit including means for quenching the heated glass load to provide tempering thereof; and control means for electrically coupling the furnace and quench unit drive mechanisms during the index cycles thereof to provide coordinated sheet glass conveyance from the furnace to the quench unit and for uncoupling the furnace conveyor drive mechanism from the quench unit conveyor drive mechanism after the coordinated index cycles thereof such that the furnace conveyor drive mechanism can oscillate a sheet glass load to be heated within the furnace independently of a sheet glass load being quenched in the quench unit.

15. A glass tempering system comprising:

a furnace including a housing defining a horizontally elongated heating chamber; said housing having opposite ends and lateral slots as well as horizontal support surfaces adjacent the slots; a plurality of elongated silica rollers spaced along the elongated length of the chamber extending transversely with respect thereto in a horizontal manner so as to support a sheet glass load within the chamber in a horizontal orientation; a drive mechanism that alternately rotates the rollers in one direction and then in the other for the same extent of rotation so as to convey the sheet glass load between the opposite ends of the chamber in an end-for-end oscillating manner; the drive mechanism including a pair of continuous drive chains, a pair of sheaves at each end of the furnace over which the pair of drive chains are respectively trained so that portions thereof between the sheaves are slidable over the horizontal support surfaces and support the rollers in a frictional driving relationship therewith so that each roller rotates in the same direction as each other roller at any given time, and a reversible electric motor for driving the sheaves at one end of the furnace in opposite directions so as to thereby drive the chains over the support surfaces in opposite directions and rotate the rollers to oscillate the sheet glass load; the drive mechanism having an index cycle wherein the sheet glass load is conveyed faster than during the oscillating movement so as to index a heated sheet glass load out of the furnace or receive a sheet glass load to be heated; the drive mechanism accelerating and decelerating the sheet glass load at a level below 1/10 g during both the oscillating movement and the index cycle to prevent slippage between the rollers and the glass load; and heating means for heating the sheet glass load to a quench temperature during the oscillating movement thereof between the ends of the chamber, the heating means supplying a greater heat input to the center of the heating chamber than to the ends thereof so that the sheet glass load is heated to a uniform temperature along the length thereof, the heating means heating each roller without any heat transfer therefrom to the glass load by conduction during the time period of each oscillation when each roller is not supporting the glass load, and the oscillating movement being at a sufficient speed and engaging each portion of the sheet glass load with a plurality of the rollers such that there is no sagging of heated glass between the rollers;

a quench unit having a horizontal roller conveyor including an electrical drive mechanism with an index cycle for receiving a heated sheet glass load from the furnace; and the quench unit including means for quenching the heated glass load to provide tempering thereof; and control means for electrically coupling the furnace and quench unit drive mechanisms during the index cycles thereof to provide coordinated sheet glass conveyance from the furnace to the quench unit and for uncoupling the furnace conveyor drive mechaism from the quench unit conveyor drive mechanism after the coordinated index cycles thereof such that the furnace conveyor drive mechanism can oscillate a sheet glass load to be heated within the furnace independenly of a sheet glass load being quenched in the quench unit.

16. A glass tempering system comprising: a furnace including a housing defining an elongated heating chamber having horizontally extending entrance and exit openings at opposite ends thereof, a horizontal roller conveyor including rollers spaced along the length of the heating chamber extending transversely thereof in a horizontal manner so as to support a sheet glass load horizontally within the chamber, a drive mechanism for driving the rollers in opposite directions for the same extent of rotation so as to convey the sheet glass load between the opposite ends of the furnace in an end-for-end oscillating manner, the drive mechanism having an index cycle for rotating the rollers to receive a sheet glass load through the entrance opening and to simultaneously convey a sheet glass load within the chamber outwardly through the exit opening, and heating means for heating a sheet glass load to a quench temperature during the oscillating movement thereof between the ends of the chamber; a load station adjacent the entrance opening of the furnace housing and including a horizontal roller conveyor having rollers and drive means therefor for driving these rollers at the same speed as the furnace conveyor rollers during the index cycle to feed a sheet glass load into the furnace while the furnace conveyor conveys a heated sheet glass load outwardly through the exit opening, the rollers of the load station conveyor being stationary during the oscillation of glass so that a sheet glass load to be heated may be placed on the load station conveyor to await indexing into the furnace; a quench unit located adjacent the exit opening of the furnace and including a horizontal roller conveyor for supporting a heated sheet glass load, upper and lower nozzles for directing quenching gas toward the upper and lower surfaces of a heated sheet glass load on the quench unit conveyor to provide tempering thereof, and a drive mechanism for driving the quench unit conveyor in an oscillating manner so the quenching gas impinges with the sheet glass load in a distributed manner to provide uniform quenching thereof, a quench unit drive mechanism having an index cycle for receiving a heated sheet glass load from the furnace and simultaneously conveying a tempered sheet glass load from the quench unit; an unload station including a horizontal roller conveyor having rollers and drive means therefor for driving these rollers at the same speed as the rollers of the quench unit conveyor during the index cycle thereof to receive a tempered sheet glass load therefrom, the rollers of the unload station conveyor being stationary during the oscillation of glass within the quench unit so the tempered sheet glass load indexed to the unload station remains stationary to await removal therefrom; and control means for coupling the furnace and quench unit drive mechanisms during the index cycles thereof to provide coordinated sheet glass conveyance from the furnace to the quench unit and for uncoupling the drive mechanisms from each other to permit independent glass load oscillation in both the furnace and the quench unit after the index cycles.

17. A system according to claim 16 wherein the control means includes electrical circuitry for coupling the furnace conveyor drive mechanism and quench unit conveyor drive mechanism during the index cycles thereof to provide the coordinated glass conveyance from the furnace to the quench unit.

18. A system according to claim 16 wherein the furnace conveyor drive mechanism and the quench unit conveyor drive mechanism index the sheet glass loads at a faster rate than the rate of oscillating movement so that a heated sheet glass load moves rapidly into the quench unit in a manner preventing glass warpage.

19. A system according to claim 16 wherein the rollers of the load and unload station conveyors are frictionally driven during the indexing cycles of the furnace and quench unit conveyors.

20. A system according to claim 19 wherein the frictional roller driving is accomplished by continuous drive chain means trained over sheaves, the rollers of the load and unload stations being engaged with portions of the chain means during the indexing cycles and disengaged therewith during the oscillation.

21. A system according to claim 20 wherein the chain means take the form of a first pair of continuous chains associated with the load station and a second pair of continuous chains associated with the unload station.

22. A system according to claim 21 wherein the furnace and quench unit conveyors also include continuous drive chain means frictionally driving the associated conveyor rollers thereof.

23. A system according to claim 20 wherein the load and unload stations include means for lifting the rollers thereof out of engagement with their associated continuous chain means during the glass oscillation and for lowering the rollers thereof into such engagement during indexing.

24. A system according to claim 23 wherein the lifting and lowering means includes at least one cam arrangement associated with each station.

25. A system according to claim 24 wherein each cam arrangement extends between a rail that engages the associated rollers and a fixed frame so that the rail is raised and lowered to control the roller engagement with the associated chain means.

26. A system according to claim 25 wherein each cam arrangement includes a cam wheel and an inclined ramp engaged with the cam wheel.

27. A system according to claim 26 wherein the cam wheel is rotatably mounted on the fixed frame and the ramp is fixedly mounted on the rail.

28. A system according to claim 27 wherein each station includes a hydraulic actuator acting on a cam arrangement thereof to thereby raise and lower the associated conveyor rollers.

29. A system according to claim 20 wherein the movement of the continuous chain means of the load and unload stations respectively control the extent of glass oscillation within the furnace and the quench unit.

30. A system according to claim 16 wherein the control means includes electrical circuitry for coupling the furnace conveyor drive mechanism and the quench unit drive mechanism to coordinate the index cycles thereof and to index the sheet glass loads at a faster rate than the rate of oscillating movement, the indexing accelerating a heated sheet glass load as said load approaches the quench unit end of the furnace conveyor so as to move rapidly into the quench unit for cooling by the quenching gas from the nozzles in a manner that prevents glass warpage.

31. A glass tempering system according to claim 16 wherein the quenching gas does not flow during the index cycle and commences flowing only after a heated sheet glass load is completely within the quench unit so that the total area of the glass load is simultaneously quenched in a manner that prevents warpage of the glass even when wide glass sheets are quenched.

32. A glass tempering system comprising: a furnace including a housing defining an elongated heating chamber having horizontally extending entrance and exit openings at opposite ends thereof, a horizontal roller conveyor including rollers spaced along the length of the heating chamber extending transversely thereof in a horizontal manner so as to support a sheet glass load horizontally within the chamber, a drive mechanism including a pair of continuous drive chains on which the rollers are supported so as to be frictionally driven thereby and a reversible electric motor for driving the chains in opposite directions so as to convey the sheet glass load between the opposite ends of the furnace in an end-for-end oscillating manner, the drive mechanism having an index cycle for rotating the rollers to receive a sheet glass load through the entrance opening and to simultaneously convey a sheet glass load within the chamber outwardly through the exit opening, and heating means for heating a sheet glass load to a quench temperature during the oscillating movement thereof between the ends of the chamber; a load station adjacent the entrance opening of the furnace housing and including a horizontal roller conveyor having rollers and a pair of continuous drive chains for frictionally driving these rollers, the load station drive chains being driven by the motor of the furnace drive mechanism, and a hydraulically actuated cam arrangement for lowering the load station rollers into frictional driving engagement with their associated drive chains during the index cycle so as to feed a sheet glass load into the furnace through the entrance opening while the furnace conveyor conveys a heated sheet glass load outwardly through the exit opening, and the load station cam arrangement lifting the load station rollers out of driving engagement with their associated drive chains during the oscillation of glass within the furnace so that a sheet glass load to be heated may be placed on the load station conveyor to await indexing into the furnace; a quench unit located adjacent the exit opening of the furnace and including a horizontal roller conveyor having spaced rollers for supporting and conveying a heated sheet glass load, upper and lower nozzles for directing quenching gas toward the upper and lower surfaces of a heated sheet glass load on the quench unit conveyor to provide tempering thereof, and a drive mechanism including a pair of continuous drive chains on which the quench unit rollers are supported so as to be frictionally driven thereby and a second reversible electric motor for driving these chains in an oscillating manner so the quenching gas impinges with the sheet glass load in a distributed manner to provide uniform quenching thereof, the quench unit drive mechanism having an index cycle for receiving a heated sheet glass load from the furnace and simultaneously conveying a tempered sheet glass load from the quench unit; and an unload station including a horizontal roller conveyor having rollers and a pair of continuous drive chains for frictionally driving these rollers, the drive chains of the unload station conveyor being driven by the electric motor of the quench unit drive mechanism, and a hydraulically actuated cam arrangement for lowering the unload station rollers into frictional driving engagement with their associated drive chains during the index cycle of the quench unit so as to receive a tempered sheet glass load therefrom, and the unload station cam arrangement lifting the unload station rollers out of engagement with their associated drive chains during the glass oscillation in the quench unit so the tempered sheet glass load indexed to the unload station remains stationary to await removal therefrom.

33. A glass tempering system comprising: a furnace including a housing having a fixed lower portion and a movable upper portion that opens downwardly with a semicircular cross-section, the upper housing portion having a lower closed position where the housing portions cooperatively define an elongated heating chamber having horizontal entrance and exit openings at opposite ends thereof and elongated slots at the lateral sides thereof, and the upper housing portion being movable vertically in a counterbalanced manner between the lower closed position and an upper open position where access into the furnace is permitted, a pair of horizontal support surfaces respectively extending externally of the chamber alongside the slots in the sides of the housing between the ends thereof, a horizontal roller conveyor including a plurality of elongated rollers spaced along the length of the heating chamber extending transversely therethrough in a horizontal manner and outwardly through the slots in the sides of the housing, a drive mechanism for the conveyor including a pair of chain sheaves at each end of the furnace and respectively associated with opposite lateral sides thereof, a pair of continuous drive chains associated with opposite lateral sides of the furnace and trained over the chain sheaves thereof so that a portion of each chain is slidable over the support surface adjacent thereto, said portions of the chains supporting the adjacent ends of the rollers so that sliding chain movement frictionally drives the rollers, and a reversible electric motor for driving the chain sheaves at one end of the furnace in one direction and then the other for the same extent of rotation so as to convey a sheet glass load between the opposite ends of the heating chamber in an end-for-end oscillating manner, and heating means on the semicircular upper housing portion for heating the sheet glass load to a quench temperature during the oscillating movement thereof between the ends of the chamber, said electric motor having an index cycle that conveys a heated sheet glass load out of the heating chamber through the exit opening and receives a sheet glass load to be heated through the entrance opening; a load station adjacent the entrance opening of the furnace housing and including a plurality of horizontal rollers spaces transversely with respect to the longitudinal length of the furnace heating chamber, a pair of continuous drive chains, chain sheaves over which the load station drive chains are trained, said load station chain sheaves being driven by the reversible electric motor that also drives the furnace conveyor chains, and means for lowering the load station rollers into frictional driving engangment with the load station drive chains during the index cycle and for lifting these rollers out of engagement with these chains during the oscillation of a sheet glass load within the furnace to thereby provide for indexing of a sheet glass load into the furnace through the entrance opening thereof while a heated sheet glass load is indexed out of the furnace through the exit opening; a quench unit located adjacent the exit opening of the furnace and including a horizontal roller conveyor for supporting a heated sheet glass load, upper and lower nozzles for directing quenching air toward the upper and lower surfaces of a heated sheet glass load on the quench unit conveyor to temper said glass load, a reversible electric motor for driving the quench unit conveyor in an oscillating manner so the quenching air impinges with the sheet glass load in a distributive manner to provide uniform quenching thereof, the motor of the quench unit having an index cycle for receiving a heated sheet glass load from the furnace and simultaneously conveying a tempered sheet glass load from the quench unit; electrical means coupling the motors of the furnace and quench unit conveyors during their index cycles so that glass flows smoothly from the furnace to the quench unit; and an unload station including a horizontal roller conveyor having a plurality of horizontal rollers, a pair of continuous drive chains, chain sheaves over which the unload station drive chains are trained, said unload station chain sheaves being driven by the reversible electric motor of the quench unit conveyor, and means for raising and lowering the unload station rollers into and out of frictional driving engagement with the unload station drive chains, the unload station rollers and chains being engaged during the electrically coordinated indexing cycles of the furnace and quench unit electric motors so that a tempered sheet glass load is received at the unloaded station from the quench unit, and the unload station rollers and drive chains being disengaged during the oscillation of glass within the quench unit so the tempered sheet glass load indexed to the unload station remains stationary to await removal therefrom.

* * * * *

REEXAMINATION CERTIFICATE (1317th)
United States Patent [19]

McMaster

[11] B1 3,994,711

[45] Certificate Issued    Jul. 3, 1990

[54] GLASS TEMPERING SYSTEM INCLUDING OSCILLATING ROLLER FURNACE

[75] Inventor: Harold A. McMaster, Woodville, Ohio

[73] Assignee: Glasstech, Inc., Perrysburgh, Ohio

Reexamination Request:
No. 90/001,288, Jul. 16, 1987

Reexamination Certificate for:
Patent No.: 3,994,711
Issued: Nov. 30, 1976
Appl. No.: 613,714
Filed: Sep. 15, 1975

[51] Int. Cl.$^5$ .................................................. C03B 27/00
[52] U.S. Cl. ........................................... 65/163; 65/114; 65/349; 65/351; 65/374.1

[56]           References Cited
          U.S. PATENT DOCUMENTS

| Patent No. | Date | Name | Class |
|---|---|---|---|
| 733,804 | 7/1903 | Blaisdell | 198/790 |
| 799,916 | 9/1905 | Meyer | 198/789 |
| 833,326 | 10/1906 | Hiler | 193/35 R |
| 896,172 | 8/1908 | Thomas | 198/789 |
| 978,466 | 12/1910 | Mathews | 193/35 J |
| 1,095,445 | 5/1914 | Alvey | 193/37 |
| 1,614,816 | 1/1927 | York | 198/790 |
| 1,669,902 | 5/1928 | Kathner | 266/259 |
| 1,696,822 | 12/1928 | Tytos | 414/157 |
| 1,737,117 | 11/1929 | Morton | 198/780 |
| 1,749,798 | 3/1930 | Boudin | 65/254 |
| 1,756,653 | 4/1930 | McArthur | 198/787 |
| 1,759,220 | 5/1930 | Brown | 198/780 |
| 1,761,199 | 6/1930 | Drake | 198/782 |
| 1,787,914 | 6/1930 | Boudin | 65/369 |
| 1,791,404 | 2/1931 | Fahrenwald | 432/236 |
| 1,842,981 | 1/1932 | Flintemann | 193/35 R |
| 1,848,162 | 3/1932 | Cone | 198/784 |
| 1,856,668 | 5/1932 | Sylvester | 198/783 |
| 1,856,669 | 5/1932 | Sylvester | 65/349 |
| 1,861,665 | 6/1932 | Owen | 198/782 |
| 1,872,062 | 8/1932 | Burke | 432/236 |
| 1,877,674 | 9/1932 | Le Mace | 198/784 |
| 1,879,998 | 9/1932 | Sylvester | 65/254 |
| 1,883,426 | 10/1932 | Walter et al. | 198/790 |
| 1,885,306 | 11/1932 | Sylvester | 198/791 |
| 1,889,082 | 11/1932 | Von Reis | 198/780 |
| 1,903,282 | 4/1933 | Bowman | 432/245 |
| 1,908,528 | 5/1933 | Milner | 198/789 |
| 1,919,837 | 7/1933 | Gotthardt | 198/570 |
| 1,923,815 | 8/1933 | Fahrenwald | 432/245 |
| 1,967,638 | 7/1934 | Von Reis | 198/779 |
| 1,967,747 | 7/1934 | Eggleston | 198/787 |
| 1,979,108 | 10/1934 | Ipsen | 266/97 |
| 2,001,773 | 5/1935 | Collar | 198/787 |
| 2,014,302 | 9/1935 | Waldron | 432/246 |
| 2,019,839 | 11/1935 | Batchell | 65/349 |
| 2,021,913 | 11/1935 | Fallon | 432/246 |
| 2,023,126 | 12/1935 | Fahrenwald | 432/249 |
| 2,128,795 | 8/1938 | Bishop | 198/855 |
| 2,135,175 | 11/1938 | Fallon | 432/249 |
| 2,140,282 | 12/1938 | Drake | 65/349 |
| 2,144,320 | 1/1939 | Bailey | 65/349 |
| 2,152,076 | 3/1939 | Menagh | 432/246 |
| 2,156,395 | 5/1939 | Klonman | 432/246 |
| 2,162,377 | 6/1939 | Cune | 65/349 |
| 2,188,401 | 1/1940 | Crowley | 65/161 |
| 2,223,124 | 11/1940 | Owen | 65/104 |
| 2,232,638 | 2/1941 | Schwalbe | 432/49 |
| 2,232,765 | 2/1941 | Bliven | 193/37 |
| 2,247,118 | 6/1941 | Drake | 65/268 |
| 2,253,198 | 8/1941 | Regan | 198/783 |
| 2,300,528 | 11/1942 | Sherts | 65/253 |
| 2,303,749 | 12/1942 | Long | 211/378 |
| 2,317,742 | 4/1943 | Donbeck et al. | 193/37 |
| 2,326,044 | 8/1943 | Littleton | 65/253 |
| 2,348,887 | 5/1944 | Drake | 65/106 |
| 2,428,344 | 9/1947 | Stookey | 432/246 |
| 2,493,479 | 1/1950 | Eggleston | 198/790 |
| 2,497,154 | 2/1950 | Dailey, Jr. | 432/246 |
| 2,528,865 | 11/1950 | Dale . | |
| 2,615,701 | 10/1952 | Ipsen . | |
| 2,632,234 | 3/1953 | Fitz . | |
| 2,646,647 | 7/1953 | Bamford et al. . | |
| 2,663,558 | 12/1953 | Ornitz et al. . | |
| 2,776,134 | 1/1957 | Wingate . | |
| 2,780,454 | 2/1957 | Martin . | |
| 2,822,077 | 2/1958 | Lorig | 198/790 |
| 2,827,153 | 3/1958 | Olk et al. | 198/790 |
| 2,848,845 | 8/1958 | Doumont | 198/784 |
| 2,883,172 | 4/1959 | Mitchell . | |
| 2,921,411 | 1/1960 | Black . | |
| 2,932,497 | 4/1960 | Dailey, Jr. et al. . | |
| 2,998,731 | 9/1961 | Renner . | |
| 3,019,885 | 2/1962 | Cushman . | |
| 3,053,368 | 9/1962 | Klahn . | |
| 3,074,288 | 1/1963 | Newton . | |
| 3,115,238 | 12/1963 | Holm et al. | 198/790 |
| 3,115,335 | 12/1963 | Ornitz et al. | 432/236 |
| 3,116,053 | 12/1963 | Ericsson | 432/236 |
| 3,127,003 | 3/1964 | Goepper et al. . | |
| 3,156,345 | 11/1964 | De Good . | |
| 3,180,480 | 4/1965 | Preston . | |
| 3,181,688 | 5/1965 | Schermer . | |
| 3,189,161 | 6/1965 | Schneider et al. . | |
| 3,199,657 | 8/1965 | Harrison . | |
| 3,223,498 | 12/1965 | Davidson, Jr. | 65/25 |
| 3,252,556 | 5/1966 | Isacsson | 193/37 |
| 3,275,124 | 9/1966 | Lutes et al. . | |
| 3,306,430 | 2/1967 | Fogg . | |
| 3,315,774 | 4/1967 | Leflet, Jr. | 193/37 |
| 3,317,303 | 5/1967 | Shorr | 65/253 |
| 3,318,672 | 5/1967 | Claassen | 65/106 |
| 3,332,762 | 7/1967 | McMaster et al. | 65/25 |
| 3,338,695 | 8/1967 | Ritter, Jr. | 65/104 |
| 3,342,467 | 9/1967 | Stirling . | |
| 3,344,903 | 10/1967 | Holm . | |
| 3,372,016 | 4/1968 | Rabric et al. | 65/114 |
| 3,374,080 | 3/1968 | Wheeler | 65/273 |
| 3,396,000 | 8/1968 | Carson et al. | 65/104 |
| 3,420,355 | 1/1969 | De Good et al. . | |
| 3,443,922 | 5/1969 | Settino | 65/193 |
| 3,447,788 | 6/1969 | Burnor . | |
| 3,454,388 | 7/1969 | Ritter, Jr. | 65/348 |
| 3,454,389 | 7/1969 | O'Connell et al. | 65/351 |
| 3,455,672 | 7/1969 | Dompkowski | 65/273 |
| 3,456,931 | 7/1969 | Ermenc et al. . | |
| 3,457,057 | 7/1969 | Gardon | 65/114 |
| 3,485,615 | 12/1969 | Rabric et al. | 65/181 |
| 3,485,618 | 12/1969 | Ritter, Jr. | 65/273 |

| | | |
|---|---|---|
| 3,488,178 | 1/1970 | Welker et al. ............... 65/268 |
| 3,489,397 | 1/1970 | Alexander ............... 432/246 |
| 3,499,720 | 3/1970 | Flynn ............... 431/349 |
| 3,500,693 | 3/1970 | Wright ............... 474/5 |
| 3,518,944 | 7/1970 | Patin ............... 198/789 |
| 3,522,029 | 7/1970 | Carson et al. ............... 65/104 |
| 3,581,875 | 6/1971 | Guis ............... 198/782 |
| 3,598,225 | 8/1971 | Merrick . |
| 3,605,991 | 9/1971 | Burt et al. . |
| 3,646,651 | 3/1972 | McGaughey . |
| 3,672,861 | 6/1972 | Ritter et al. ............... 65/350 |
| 3,680,848 | 8/1972 | Elkow . |
| 3,682,610 | 8/1972 | Misson ............... 65/104 |
| 3,751,195 | 8/1973 | Snow ............... 432/8 |
| 3,806,312 | 4/1974 | McMaster et al. ............... 432/121 |
| 3,815,197 | 6/1974 | Sukenik . |
| 3,847,260 | 11/1974 | Fowler ............... 193/37 |
| 3,853,526 | 12/1974 | Hochart ............... 65/253 |
| 3,890,128 | 6/1975 | Melling et al. ............... 68/220 |
| 3,936,291 | 2/1976 | McMaster ............... 65/351 |

FOREIGN PATENT DOCUMENTS

| | | |
|---|---|---|
| 511244 | 10/1930 | Fed. Rep. of Germany . |
| 567549 | of 1933 | Fed. Rep. of Germany . |
| 704219 | 3/1941 | Fed. Rep. of Germany . |
| 1045955 | of 1958 | Fed. Rep. of Germany . |
| 1082171 | of 1954 | France . |
| 1448278 | of 1966 | France . |
| 1515395 | of 1968 | France . |
| 1576667 | of 1969 | France . |
| 314385 | of 1929 | United Kingdom . |
| 309180 | of 1930 | United Kingdom . |
| 1193762 | of 1970 | United Kingdom . |

OTHER PUBLICATIONS

Willis, "Continuous Heat-Treatment of Steel Plate", Iron & Steel Engineer (Apr. 1962).
"Homestead Continuous Plate Heat Treating Facilities Highly Flexible", Industrial Heating (1964).
Korbin, "Heat-Treat Line for Wide Plate Accents 'Specialty' Trend", The Iron Age (Mar. 7, 1963).
"Drever Continuous Plate and Bar Heat Treating", brochure, 12-64.

*Primary Examiner*—Kenneth M. Schor

[57] ABSTRACT

The glass tempering system includes an elongated furnace in which a horizontal conveyor oscillates a glass sheet between opposite ends of the chamber in a manner to shorten the necessary furnace length to heat the glass to its quench temperature. A load station at one end includes a horizontal conveyor driven by the same drive mechanism as the furnace conveyor during the index cycle so that a glass sheet is received while another glass sheet is being indexed to the quench unit. A second motor drives the quench unit conveyor in an oscillating manner. The two drive mechanisms are coupled during the index cycle so that a tempered glass sheet is conveyed from the quench unit to an unload station as a heated glass sheet is being conveyed to the quench unit. The conveyor of the unload station is driven by the quench unit drive during the index cycle to receive the tempered glass sheet. Each of the conveyors includes drive chains which frictionally drive their conveyor rollers. The conveyor rollers of the load and unload stations are lifted off their respective drive chains to stop the rollers for unloading of the glass thereon.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–33 is confirmed.

New claims 34–40 are added and determined to be patentable.

*34. A glass tempering system comprising:*
*a furnace including:*
  *a housing defining a horizontally elongated heating chamber;*
  *a furnace conveyor including a plurality of elongated rollers spaced along the elongated length of the chamber extending transversely with respect thereto in a horizontal manner so as to support a sheet glass load within the chamber in a horizontal orientation;*
  *a furnace conveyor drive mechanism providing means for alternately rotating the rollers in one direction and then in the other for the same extent of rotation so as to convey the sheet glass load between the opposite ends of the chamber in an end-for-end oscillating manner; and*
  *heating means for heating the sheet glass load to a quench temperature during the oscillating movement thereof between the ends of the chamber;*
  *wherein said furnace conveyor drive mechanism causes the oscillating movement of the glass load at a sufficient speed, while each portion of the glass load is engaged by a plurality of rollers, such that there is no sagging of heated glass between the rollers, said furnace conveyor drive mechanism having an index cycle that rotates all of the furnace rollers to convey a heated sheet glass load out of the furnace or to receive a sheet glass load to be heated;*
*a quench unit including:*
  *a horizontal roller conveyor having an index cycle for receiving a heated sheet glass load from the furnace; and*
  *means for quenching the heated glass load to provide tempering thereof; and;*
*control means for coupling the furnace conveyor drive mechanism during the index cycle thereof with the roller conveyor of the quench unit during the index cycle thereof to provide coordinated sheet glass load conveyance from the furnace to the quench unit, said control means uncoupling the furnace conveyor drive mechanism from the quench unit conveyor after the coordinated index cycles thereof such that the furnace conveyor drive mechanism can oscillate a sheet glass load to be heated within the furnace independently of a sheet glass load being quenched in the quench unit.*

*35. A system according to claim 1 wherein the drive mechanism causes the length of the oscillating glass load movement in the furnace to be greater than the length of the sheet glass load so that no one roller is constantly engaged with the oscillating glass load.*

*36. A system according to claim 1 wherein said control means regulates the length of the oscillating glass load movement in the furnace to be equal to at least twice the length of the sheet glass load so that each roller is disengaged from the oscillating glass load for a period of time to enable the heating means to heat said rollers without any concomitant heat transfer through conduction from the rollers to the glass load.*

*37. A system according to claim 1 wherein said heating means further comprises means for providing heat input to the furnace which is variable along the length of the heating chamber so as to insure a uniform temperature of the heated sheet glass load along the length thereof, the heat input being greater at the center of the chamber than at the ends thereof.*

*38. A system according to claim 1 wherein said control means further causes the sheet glass load to be conveyed at a faster rate during the index cycle than during the oscillating movement.*

*39. A system according to claim 16 wherein the furnace conveyor drive mechanism and the quench unit conveyor drive mechanism are provided with index means for indexing the sheet glass loads at a faster rate than the rate of oscillating movement so that a heated sheet glass load moves rapidly into the quench unit in a manner preventing glass warpage.*

*40. A glass tempering system according to claim 16 further comprising means to control the flow of quenched gas to the upper and lower nozzles so that the quenching gas does not flow during the index cycle and commences flowing only after a heated sheet glass load is completely within the quench unit so that the total area of the glass load is simultaneously quenched in a manner that prevents warpage of the glass even when wide glass sheets are quenched.*

* * * * *